United States Patent
Kuwata et al.

(10) Patent No.: US 9,596,282 B2
(45) Date of Patent: Mar. 14, 2017

(54) DELIVERY MANAGING DEVICE, TERMINAL, AND DELIVERY MANAGING METHOD

(71) Applicants: Masahiro Kuwata, Tokyo (JP); Kiyoshi Kasatani, Kanagawa (JP)

(72) Inventors: Masahiro Kuwata, Tokyo (JP); Kiyoshi Kasatani, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 15/022,026

(22) PCT Filed: Sep. 4, 2014

(86) PCT No.: PCT/JP2014/073402
§ 371 (c)(1),
(2) Date: Mar. 15, 2016

(87) PCT Pub. No.: WO2015/045787
PCT Pub. Date: Apr. 2, 2015

(65) Prior Publication Data
US 2016/0234275 A1    Aug. 11, 2016

(30) Foreign Application Priority Data

Sep. 27, 2013 (JP) .................... 2013-202425

(51) Int. Cl.
*H04N 7/15* (2006.01)
*H04L 29/06* (2006.01)
(Continued)

(52) U.S. Cl.
CPC ........ *H04L 65/601* (2013.01); *G06F 21/6209* (2013.01); *H04L 65/403* (2013.01);
(Continued)

(58) Field of Classification Search
None
See application file for complete search history.

(56) References Cited

U.S. PATENT DOCUMENTS

2004/0158704 A1*  8/2004  Oates ................... H04L 63/061
                                                          713/151
2007/0219981 A1   9/2007  Takaai et al.
(Continued)

FOREIGN PATENT DOCUMENTS

EP      2 348 671 A1    7/2011
JP      2005-204046     7/2005
(Continued)

OTHER PUBLICATIONS

International Search Report issued Oct. 14, 2014 in PCT/JP2014/073402 filed Sep. 4, 2014.

(Continued)

*Primary Examiner* — Creighton Smith
(74) *Attorney, Agent, or Firm* — Oblon, McClelland, Maier & Neustadt, L.L.P.

(57) ABSTRACT

A delivery managing device to which a plurality of terminals are connected through a network includes a creating unit that creates display information based on operation information indicating an operation input accepted by a terminal; a converting unit that converts the display information into video information; and a delivery unit that delivers the video information to a terminal. When non-public operation information is received from a terminal, the non-public operation information indicating operation information not to be published to another terminal, the delivery unit delivers video information that is converted from display information not based on the non-public operation information, to the other terminal.

5 Claims, 27 Drawing Sheets

(51) Int. Cl.
*H04W 4/18* (2009.01)
*H04W 12/08* (2009.01)
*G06F 21/62* (2013.01)

(52) U.S. Cl.
CPC ............... *H04N 7/15* (2013.01); *H04W 4/18* (2013.01); *H04W 12/08* (2013.01)

(56) References Cited

U.S. PATENT DOCUMENTS

| | | | |
|---|---|---|---|
| 2011/0193932 A1 | 8/2011 | Long et al. | |
| 2011/0249595 A1* | 10/2011 | Rozov | H04L 12/22 370/259 |
| 2012/0054039 A1* | 3/2012 | Patwa | G06Q 30/00 705/14.66 |
| 2013/0135346 A1 | 5/2013 | Sakuramata et al. | |
| 2014/0280446 A1 | 9/2014 | Kasatani | |
| 2014/0280458 A1 | 9/2014 | Kasatani | |
| 2014/0280722 A1 | 9/2014 | Kasatani | |
| 2014/0280725 A1 | 9/2014 | Kasatani | |
| 2014/0280777 A1 | 9/2014 | Kasatani | |
| 2014/0282039 A1 | 9/2014 | Kasatani | |
| 2014/0282778 A1 | 9/2014 | Kasatani | |
| 2014/0282793 A1 | 9/2014 | Kasatani | |
| 2014/0282794 A1 | 9/2014 | Kasatani | |
| 2016/0014193 A1 | 1/2016 | Kasatani | |
| 2016/0021405 A1 | 1/2016 | Kasatani | |
| 2016/0044079 A1 | 2/2016 | Kasatani | |

FOREIGN PATENT DOCUMENTS

| | | |
|---|---|---|
| JP | 2006-128951 | 5/2006 |
| JP | 2006-146415 | 6/2006 |
| JP | 2006-323607 | 11/2006 |
| WO | 2014/142342 | 9/2014 |
| WO | 2014/142343 | 9/2014 |
| WO | 2014/142354 | 9/2014 |
| WO | 2014/142358 | 9/2014 |

OTHER PUBLICATIONS

Extended European Search Report issued Sep. 1, 2016 in Patent Application No. 14847620.3.

* cited by examiner

| DRAWING COMMAND INFORMATION | COORDINATE INFORMATION | TERMINAL INFORMATION | SETTING INFORMATION |
|---|---|---|---|
| FIGURE A | (x1,y1) | 5f1 | NON-PUBLIC |
| FIGURE B | (x2,y2) | 5f1 | PUBLIC |
| FIGURE C | (x3,y3) | 5f2 | PUBLIC |
| ⋮ | ⋮ | ⋮ | ⋮ |

| CHECK | SHARED ID | DISPLAY NAME |
|---|---|---|
| | v003 | TOKYO HEADQUARTER 10F MFP |
| ✓ | v006 | OSAKA EXHIBITION HALL 1F MULTI-DISPLAY |
| ⋮ | ⋮ | ⋮ |

DELIVERY-DESTINATION SELECTING MENU

CHECK DELIVERY DESTINATION OF CONTENT AND PRESS "OK"

OK    CANCEL

FIG.16

| TER-MINAL ID | USER CERTIFI-CATE | CONTRACT INFORMATION | TERMINAL TYPE | SETTING INFORMATION (HOME URL) | OPERATION ENVIRONMENT INFORMATION (FAVORITE) (PREVIOUS COOKIE INFORMATION) (CACHE FILE) | SHARED ID | INSTAL-LED LOCA-TION | DISPLAY NAME |
|---|---|---|---|---|---|---|---|---|
| t001 | ...... | FHD,30FPS, 3 MONTH CONTRACT | LAPTOP PC | http://www.rocoh.co.jp | ...... | v001 | - | BEIJING OFFICE 10F RECEPTION TERMINAL |
| t002 | ...... | HD,30FPS, 3 MONTH CONTRACT | TABLET TERMINAL | http://www.rocoh.co.jp | ...... | v002 | - | NEW YORK OFFICE 1F LOBBY RECEPTION TERMINAL |
| t003 | ...... | QVGA,15FPS, 6 MONTH CONTRACT | MFP | http://www.rocoh.co.jp | ...... | v003 | - | TOKYO HEADQUARTER 10F MFP |
| t004 | ...... | WXGA,15FPS, 12 MONTH CONTRACT | PROJECTOR | http://www.pontax.co.jp | ...... | v004 | - | TOKYO HEADQUARTER 1F LOBBY PROJECTOR |
| t005 | ...... | WXGA,15FPS, 6 MONTH CONTRACT | CAMERA/ MICROPHONE/ SPEAKER | - | - | v005 | - | NAGOYA OFFICE 2F VIDEO CONFERENCE ROOM TERMINAL |
| t006 | ...... | FHD,30FPS, 12 MONTH CONTRACT | MULTI-DISPLAY | - | - | v006 | LEFT | OSAKA EXHIBITION HALL 1F MULTI-DISPLAY |
| t007 | ...... | FHD,30FPS, 12 MONTH CONTRACT | MULTI-DISPLAY | - | - | v006 | MIDDLE | OSAKA EXHIBITION HALL 1F MULTI-DISPLAY |
| t008 | ...... | FHD,30FPS, 12 MONTH CONTRACT | MULTI-DISPLAY | - | - | v006 | RIGHT | OSAKA EXHIBITION HALL 1F MULTI-DISPLAY |
| ... | ... | ... | ... | ... | ... | ... | ... | ... |

| TERMINAL ID | SHARED ID |
|---|---|
| t001 | v003 |
| t001 | v006 |
| t002 | v001 |
| ⋮ | ⋮ |

7020

521
WRITING FROM
COMMUNICATION
TERMINAL 5f2

520
WRITING FROM
COMMUNICATION
TERMINAL 5f2

522
WRITING (NON-
PUBLIC) FROM
COMMUNICATION
TERMINAL 5f1

521
WRITING FROM
COMMUNICATION
TERMINAL 5f2

520
WRITING FROM
COMMUNICATION
TERMINAL 5f2

DELIVERY MANAGING DEVICE, TERMINAL, AND DELIVERY MANAGING METHOD

FIELD

The present invention relates to a delivery managing device, a terminal, and a delivery managing method.

BACKGROUND

In recent years, along with the prevalence of the Internet, cloud computing has been used in various fields. Cloud computing is a service usage form in which a user uses a service (cloud service) that is provided by a server on the Internet by using a communication terminal connected to the Internet, and pays for the service.

However, web contents that are handled on the Internet tend to be rich to meet various demands. Accordingly, there is a problem that a load on a communication terminal is heavy when rich contents are used by using the communication terminal to use a service through the Internet.

Moreover, Patent Literature 1 discloses a technique in which communication terminals to which an operation to display drawing information such as characters and pictures can be input are connected to a network, and the terminals are communicated with each other by the drawing information.

SUMMARY

Technical Problem

However, in the conventional technique, drawing information that is displayed only at an own terminal and drawing information that is displayed also at another terminal cannot be displayed on the terminals in a distinguished manner.

The present invention is achieved in view of the above problem, and it is an object of the present invention to provide a delivery managing device, a terminal, and a delivery managing method that enable to display drawing information to be displayed only at an own terminal and drawing information to be displayed also at another terminal in a distinguished manner.

Solution to Problem

To solve the above problem, the present invention is a delivery managing device to which a plurality of terminals are connected through a network, including: a creating unit that creates display information based on operation information indicating an operation input accepted by a terminal; a converting unit that converts the display information into video information; and a delivery unit that delivers the video information to a terminal, wherein when non-public operation information is received from a terminal, the non-public operation information indicating operation information not to be published to another terminal, the delivery unit delivers video information that is converted from display information not based on the non-public operation information, to the other terminal.

Advantageous Effects of Invention

According to the present invention, drawing information that is to be displayed only at an own terminal and drawing information to be displayed also at another terminal can be displayed on the terminals in a distinguished manner.

BRIEF DESCRIPTION OF DRAWINGS

FIG. 15 is a conceptual drawing of a delivery-destination-selecting menu screen.
FIG. 16 is a conceptual drawing of a terminal managing table.
FIG. 17 is a conceptual drawing of a usable-terminal managing table.

DESCRIPTION OF EMBODIMENTS

A delivery system according to a present embodiment is explained in detail below using drawings. An embodiment described below is an application example as a delivery system in which cloud computing is used, a web browser (hereinafter, "browser") and an encoder are both interfaced thereto to be operated on the cloud, and web contents are converted into video data, sound data, or video data and sound data, to be delivered to a communication terminal such as a personal computer and an electronic blackboard. Note that an "image" described below includes a still image and a moving image. Moreover, a "video" described below basically signifies a moving image, and includes that in a still image state as a result of pausing the moving image. Furthermore, when at least one of a still image and sound is indicated, it is expressed as "still image (sound)". Moreover, when at least one of an image and sound is indicated, it is expressed as "image (sound)". When at least one of a video and sound is indicated, it is expressed as "video (sound)".

[Overview of Embodiment]

Figure 1:
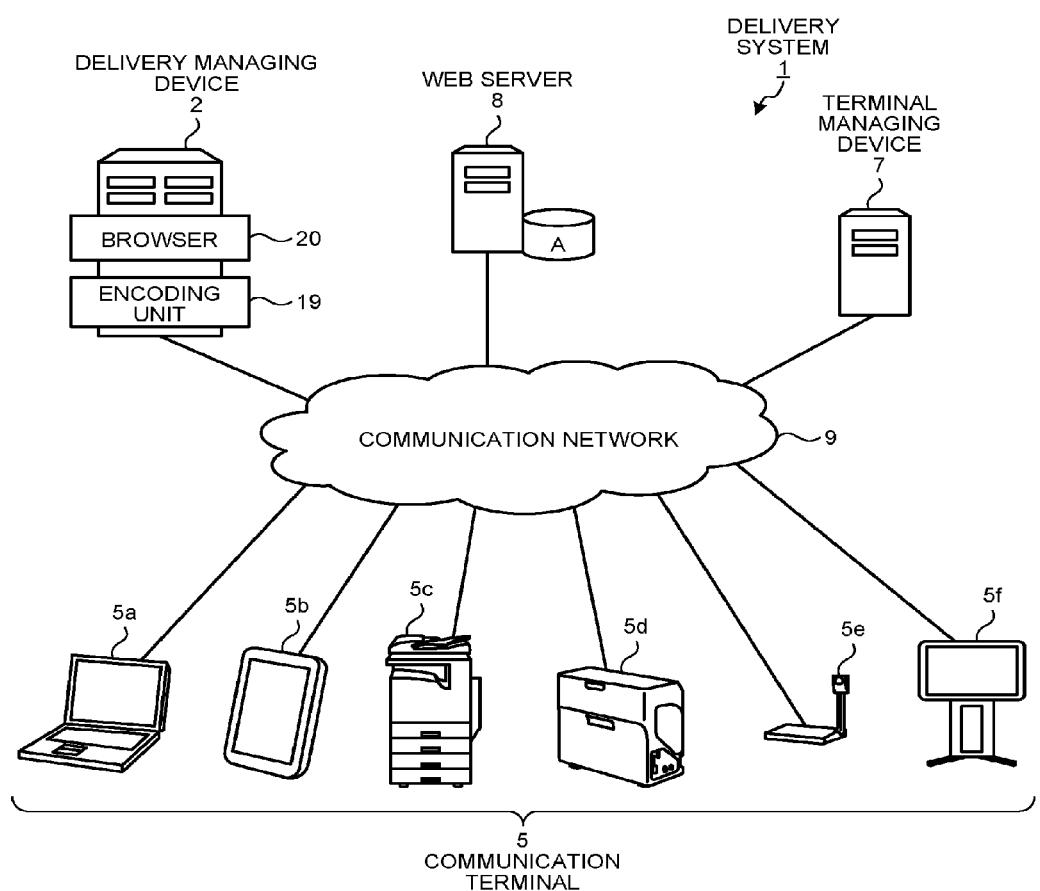
FIG. 1 is a schematic diagram of a delivery system according to a present embodiment.

First, an overview of the present embodiment is explained using FIG. 1. FIG. 1 is a schematic diagram of a delivery system 1 according to the present embodiment.

<Overview of System Configuration>

First, an overview of a configuration of the delivery system 1 is explained.

As shown in FIG. 1, the delivery system 1 of the present embodiment includes a delivery managing device 2, multiple communication terminals 5a to 5f, a terminal managing device 7, and a web server 8. In the following, when an arbitrary communication terminal is indicated out of the multiple communication terminals 5a to 5f, it is expressed as "communication terminal 5". Any of the delivery managing device 2, the terminal managing device 7, and the web server 8 is constituted of a server computer.

The communication terminal 5 is a terminal that is used by a user that receives a service of the delivery system 1. The communication terminal 5a out of these is a laptop personal computer (PC). The communication terminal 5b is a mobile terminal such as a smartphone and a tablet terminal. The communication terminal 5c is a multifunction peripheral (MFP) printer product in which respective functions of copy, scan, print, and facsimile are combined. The communication terminal 5d is a projector. The communication terminal 5e is a videoconference terminal that is equipped with a camera, a microphone, and a speaker. The communication terminal 5f is an electronic blackboard (whiteboard) that is capable of electronically converting a content drawn by a user and the like.

Note that the communication terminal 5 is not limited to the terminals as shown in FIG. 1, but may be a device that can perform communication through a communication network such as the Internet, namely, a watch, a vending machine, a gas meter, a car navigation system, a game, an air conditioner, an illumination unit, a camera alone, a microphone alone, a speaker alone, and the like.

Moreover, the delivery managing device 2, the communication terminal 5, the terminal managing device 7, and the web server 8 can perform communication by a communication network 9 such as the Internet and a local area network (LAN). This communication network 9 includes a network by a wireless communication such as a 3rd Generation (3G), Worldwide Interoperability for Microwave Access (WiMAX), a Long Term Evolution (LTE).

Figure 2:
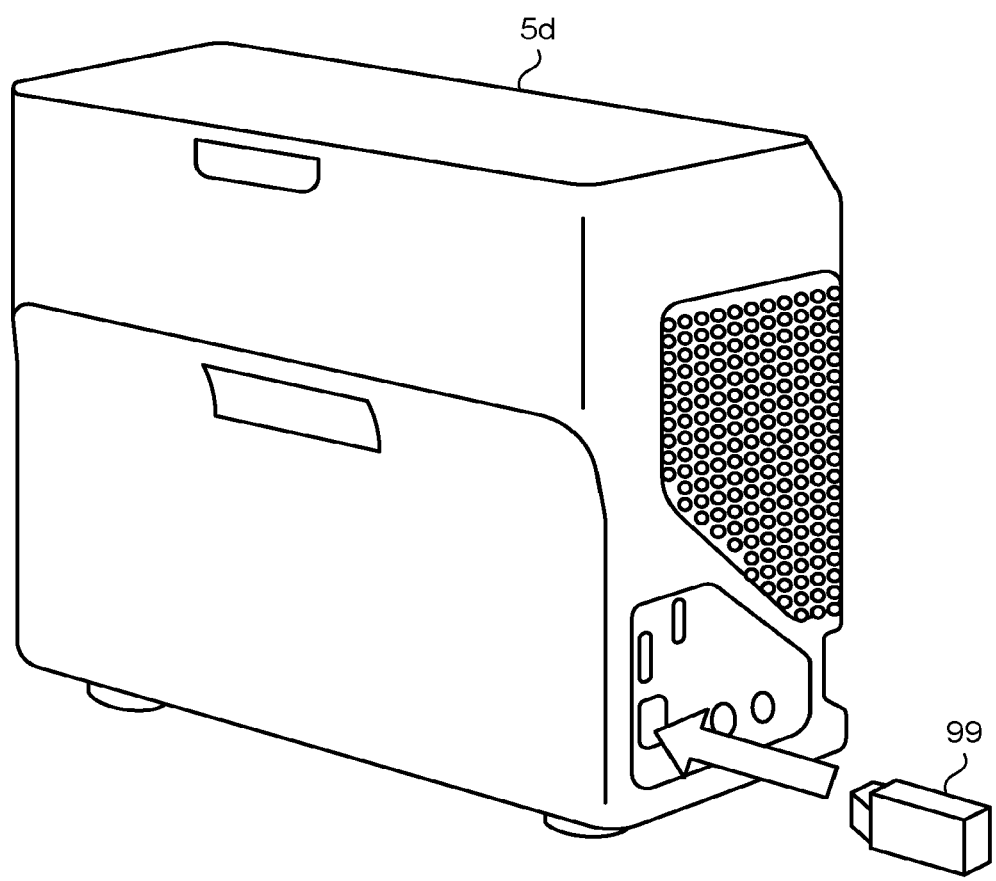
FIG. 2 is an image drawing at the time of installing a dongle into a communication terminal.

Depending on the communication terminal 5, there is one that does not have a function of communication with other terminals and systems through the communication network 9, as the communication terminal 5d and the like. However, as shown in FIG. 2, by inserting a dongle 99 into an interface unit, such as a universal serial bus (USB) and a high-definition multimedia interface (HDMI) (registered trademark), of the communication terminal 5d by a user, the communication terminal 5d is enabled to perform communication with other terminals and systems through the communication network 9. FIG. 2 is an image drawing when the dongle 99 is installed into a communication terminal.

The delivery managing device 2 has a browser 20 on the cloud, and acquires one or more pieces of content data that is expressed by a predetermined description language by a renderer function in the browser 20 to perform rendering, thereby creating still image data such as bitmap data by RGB (red, green, blue), and frame data as sound data (that is, still image (sound) data) such as pulse code modulation (PCM) data. Note that content data is data that is acquired from the web server 8, an arbitrary communication terminal, or the like, and includes image (sound) data by hypertext markup language (HTML) or cascading style sheets (CSS), image (sound) data by moving picture experts group 4 (MPEG-4, MP4), sound data by advanced audio coding (AAC), and the like.

Furthermore, the delivery managing device 2 has an encoding unit 19 on the cloud, and the encoding unit 19 functions as an encoder, thereby converting respective frame data as still image (sound) data into video (sound) data in a compressed coding scheme such as H.264 (MPEG-4 (AVC), H.265, and motion joint photographic experts group (JPEG).

On the other hand, the terminal managing device 7 performs login verification of the communication terminal 5, and performs management of contract information and the like of the communication terminal 5. Moreover, the terminal managing device 7 has a simple mail transfer protocol (SMTP) server function to transmit an email. The terminal managing device 7 can be implemented, for example, as a virtual machine that is developed on a cloud service (infrastructure as a service (IaaS)). It is preferable that the terminal managing device 7 be operated in a multiplexed manner to provide services continuously, to be prepared for an unexpected happening.

The browser 20 of the delivery managing device 2 enables real time communication (RTC/collaboration). Furthermore, it also has an encoder bridge unit 30 (the encoding unit 19) in FIG. 11 described later included in the delivery managing device 2, and this encoding unit 19 performs real time encoding on video (sound) data that is created by the browser 20, and is capable of outputting video (sound) data that is created by conversion based on, for example, H.264 standards. Therefore, the processing of the delivery managing device 2 differs from a case of delivery by reading non-real time video (sound) data that is recorded on a digital versatile disk (DVD), for example, by a DVD player, and the like Note that not only the delivery managing device 2 but also the communication terminal 5 may have a browser. In this case, by updating the browser 20 of the delivery managing device 2, it becomes unnecessary to activate browsers of the respective communication terminals 5.

<Overview of Various Delivery Methods>

Subsequently, an overview of various delivery methods is explained.

(Basic Delivery)

Figure 3:
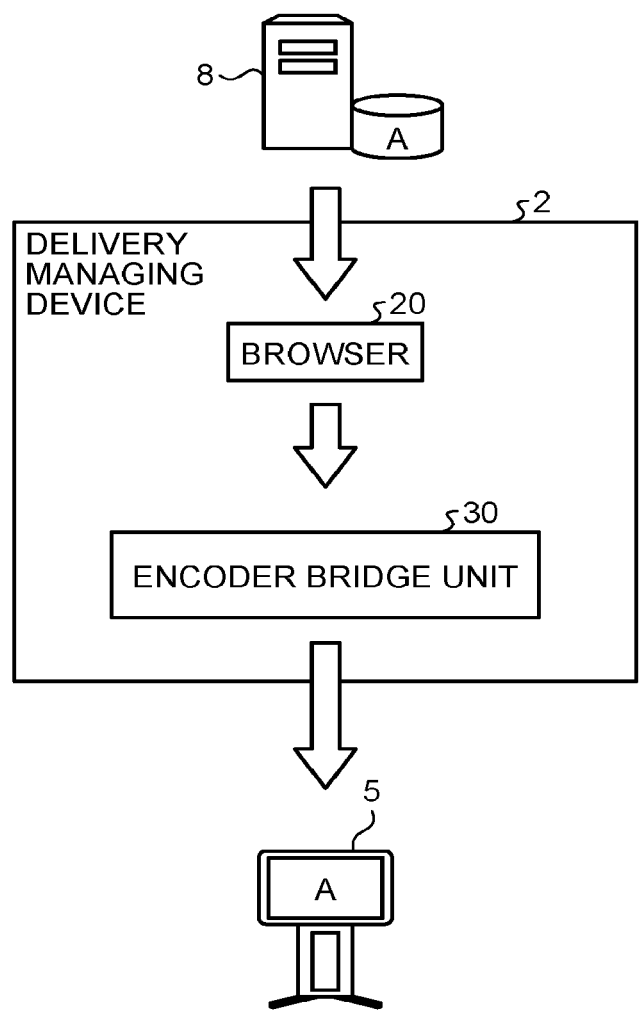
FIG. 3 is a conceptual drawing showing a basic delivery method.

FIG. 3 is a conceptual drawing showing a basic delivery method of the delivery system 1 of the present embodiment. In the delivery system 1, as shown in FIG. 3, the browser 20 of the delivery managing device 2 acquires web content data [A] from the web server 8 and performs rendering, thereby creating video (sound) data [A]. The encoder bridge unit 30 then performs encoding and the like of the video (sound)

data [A], to deliver to the communication terminal 5. Thus, even if web contends created by HTML, CSS, or the like is rich, because it is delivered as video (sound) data of H.264, MPEG-4, or the like, it becomes possible to reproduce a video (sound) smoothly even with the communication terminal 5 of low specification. Moreover, in the delivery system 1 of the present embodiment, by updating the browser 20 of the delivery managing device 2, it becomes possible to reproduce latest rich web contents without updating a browser that provides the contents to the communication terminal 5 as a local unit.

Figure 5:
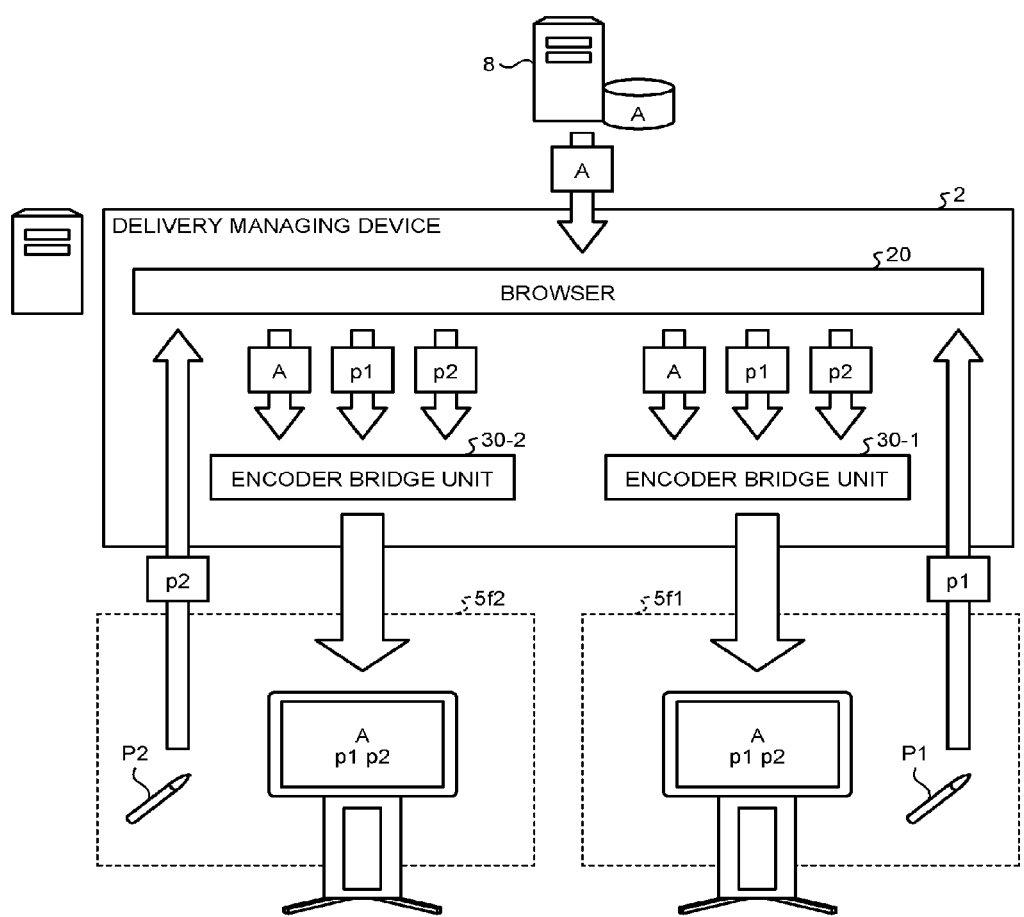
FIG. 5 is a conceptual drawing showing a delivery method when operation information is published.
Figure 6:
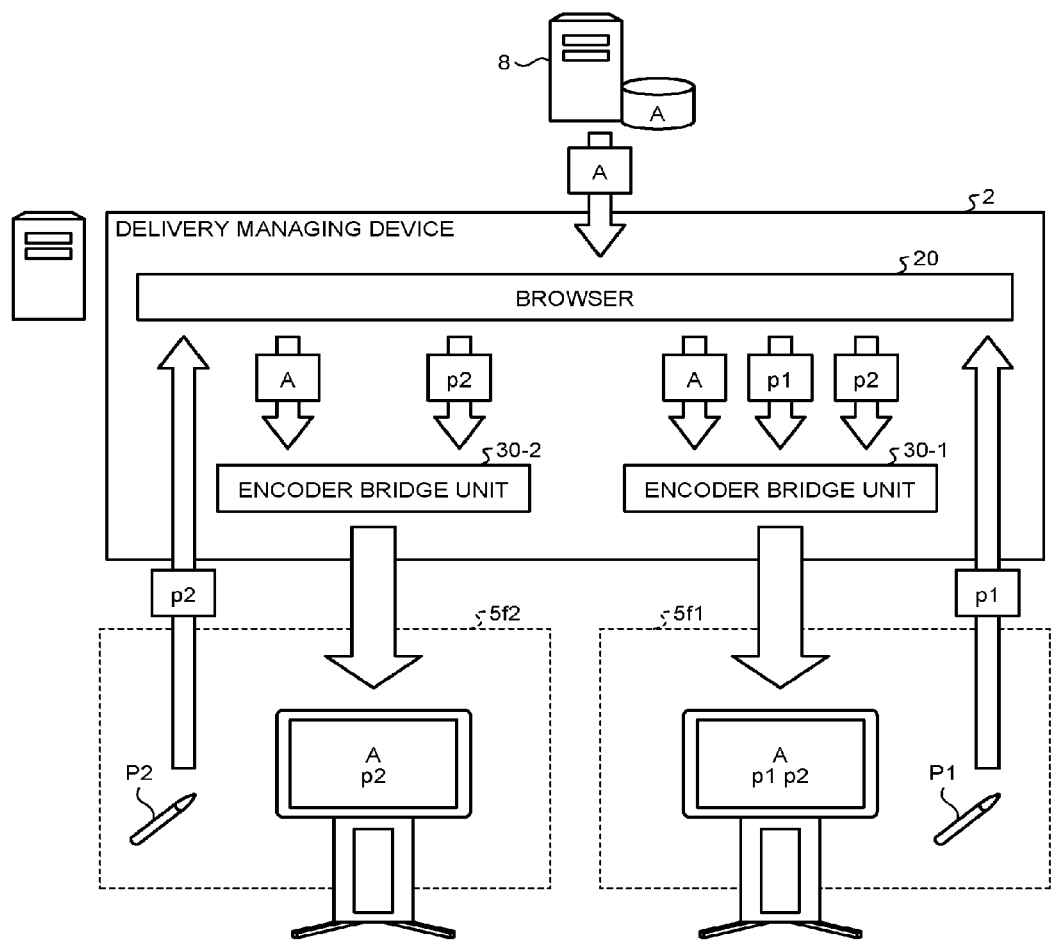
FIG. 6 is a conceptual drawing showing a delivery method when operation information is hidden from the public.

Furthermore, the delivery system 1 can also deliver web contents as video (sound) data to the communication terminals 5 that are located at the same site or at multiple sites by applying the delivery method described above, as shown in FIG. 4 to FIG. 6. A delivery method shown in FIG. 4 to FIG. 6 is explained here.

(Multi-display)

Figure 4:
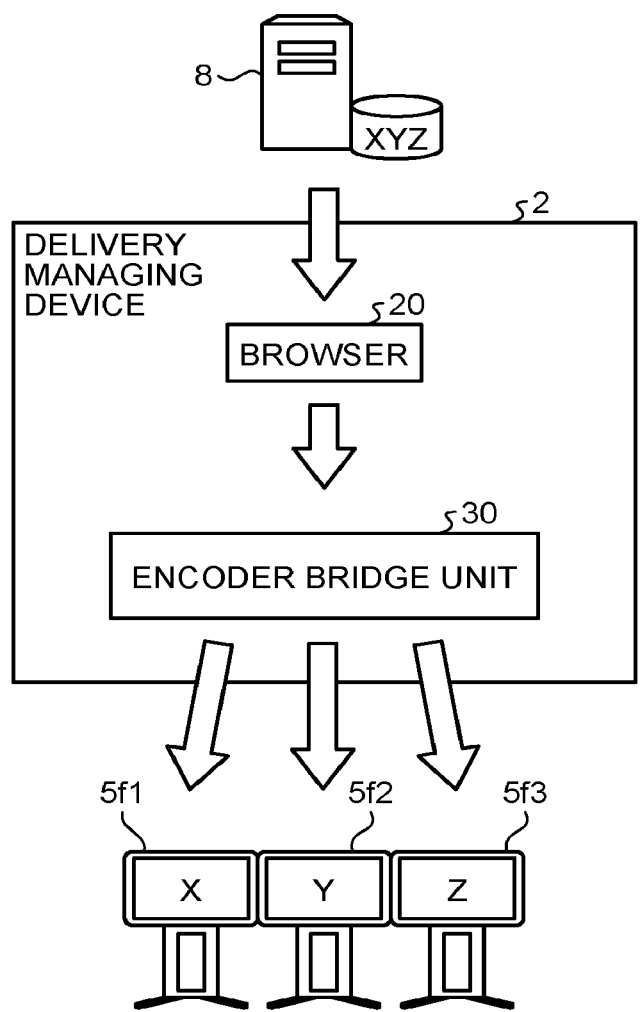
FIG. 4 is a conceptual drawing of a multi-display.

FIG. 4 is a conceptual drawing of a multi-display. As shown in FIG. 4, the single browser 20 of the delivery managing device 2 acquires web content data [XYZ] from the web server 8 and performs rendering, thereby creating a single piece of video (sound) data [XYZ]. The encoder bridge unit 30 then divides the single piece of the video (sound) data [XYZ] into multiple pieces of video (sound) data [X], [Y], [Z] and then performs encoding. Thereafter, the delivery managing device 2 delivers divided video (sound) data [X] to a communication terminal 5/1. Similarly, the delivery managing device 2 delivers the divided video (sound) data [Y] to the communication terminal 5/2, and delivers the divided video (sound) data [Z] to the communication terminal 5/3. Thus, for example, even with the horizontally long web content data [XYZ], video is displayed in a divided manner to the communication terminals 5/1, 5/2, and 5/3. Therefore, by arranging these communication terminals 5/1, 5/2, and 5/3 in a row, a similar effect as displaying a single large video can be obtained. In this case, it is necessary that the terminal communications (5/1, 5/2, 5/3) have the same display reproduction performance (the same resolution and the like). Such a delivery method is called, for example, "multi-display".

(Public Setting and Non-public Setting of Delivery of Operation Data)

The delivery system 1 of the present embodiment can switch whether to deliver operation data of the communication terminal 5 also to the other communication terminals by setting the communication terminal 5. A method of switching the setting of the communication terminal 5 is performed, for example, by operating a button that is displayed on a display screen of the communication terminal 5. An overview of a delivery method of operation data is explained here, and detailed explanation is described later.

First, public setting for delivering operation data of the own communication terminal 5 also to the other communication terminals 5 is explained. That is, a case in which the setting for delivery of operation data is set to be public is explained. FIG. 5 is a conceptual drawing showing a delivery method when operation information is published. As shown in FIG. 5, in a first site (right side in FIG. 5), the communication terminal 5/1 is used as an electronic blackboard, and an electronic pen P1 is used as an input device. Moreover, in a second site (left side in FIG. 5), the communication terminal 5/2 is used as an electronic blackboard, and an electronic pen P2 is used as an input device.

The communication terminal 5/1 displays a content A as a background image. The content A of the background image is received from the delivery managing device 2. Specifically, the delivery managing device 2 receives the content A from the web server 8, and makes it into a data format to display as the background image on the communication terminal 5/1 by rendering the content A by the browser 20. An encoder bridge unit 30-1 encodes the content A subjected to rendering, to transmit to the communication terminal 5/1. A case of displaying the content A on the communication terminal 5/2 as a background image is also the same.

The communication terminal 5/1 accepts operation data that indicates an operation input made by the electronic pen P1. The operation data includes coordinate information indicating positions of, for example, a character and a figure drawn at the communication terminal 5/1, and the like. The communication terminal 5/1 transmits terminal transmission information in which operation data [p1] indicating the accepted operation input, information indicating that the operation data is set to be public, and identification information to identify the communication terminal 5/1 are associated with each other, to the delivery managing device 2.

Similarly, the communication terminal 5/2 accepts operation data that indicates an operation input made by the electronic pen P2. The communication terminal 5/2 transmits terminal transmission information in which operation data [p2] indicating the accepted operation input, information indicating that the operation data is set to be public, and identification information to identify the communication terminal 5/2 are associated with each other, to the delivery managing device 2.

Receiving the operation data [p1] from the communication terminal 5/1, the delivery managing device 2 transmits the operation data [p1] to the browser 20. Similarly, receiving the operation data [p2] from the communication terminal 5/2, the delivery managing device 2 transmits the operation data [p2] to the browser 20. Because the setting information of the operation data [p1] and the operation data [p2] are both set to be public, the browser 20 performs rendering of the operation data [p1], the operation data [p2], and the content A, to create one piece of public display information.

The browser 20 transmits the public display information to the encoder bridge unit 30-1 and an encoder bridge unit 30-2. The encoder bridge unit 30-1 encodes the public display information and transmits to the communication terminal 5/1. The encoder bridge unit 30-2 encodes the public display information and transmits to the communication terminal 5/1. The communication terminal 5/1 and the communication terminal 5/2 display the public display information (the operation data [p1], the operation data [p2], and the content A) received from the delivery managing device 2.

Next, non-public setting for not delivering operation data of the own communication terminal 5 to the other communication terminals 5 is explained. That is, a case in which the setting for delivery of operation data is set to be non-public is explained. FIG. 6 is a conceptual drawing showing a delivery method when operation information is non-public. As shown in FIG. 6, in a first site (right side in FIG. 6), the communication terminal 5/1 is used as an electronic blackboard, and the electronic pen P1 is used as an input device. Moreover, in a second site (left side in FIG. 6), the communication terminal 5/2 is used as an electronic blackboard, and the electronic pen P2 is used as an input device. A case in which the communication terminal 5/1 is set to be non-public and the communication terminal 5/2 is set to be public is explained as an example.

The communication terminal 5/1 and the communication terminal 5/2 display the content A as a background image.

The communication terminal 5/1 accepts operation data that indicates an operation input made by the electronic pen Pl. The communication terminal 5/1 transmits terminal transmission information in which the operation data [p1] indicating the accepted operation input, information indicating that the operation data is set to be non-public, and the identification information to identify the communication terminal 5/1 are associated with each other, to the delivery managing device 2.

Similarly, the communication terminal 5/2 accepts operation data that indicates an operation input made by the electronic pen P2. The communication terminal 5/2 transmits terminal transmission information in which operation data [p2] indicating the accepted operation input, information indicating that the operation data is set to be public, and the identification information to identify the communication terminal 5/2 are associated with each other, to the delivery managing device 2.

Receiving the operation data [p1] from the communication terminal 5/1, the delivery managing device 2 transmits the operation data [p1] to the browser 20. Similarly, receiving the operation data [p2] from the communication terminal 5/2, the delivery managing device 2 transmits the operation data [p2] to the browser 20.

Because the setting information of the operation data [p1] is set to be non-public, and the setting information of the operation data [p2] is set to be public, the browser 20 creates non-public display information and public display information. Specifically, the browser 20 performs rendering of the operation data [p1], the operation data [p2], and the content A, to create one piece of non-public display information, and transmits the non-public display information to the encoder bridge unit 30-1. The browser 20 performs rendering of the operation data [p2] and the content A to create one piece of public display information, and transmits the public display information to the encoder bridge unit 30-2.

The encoder bridge unit 30-1 encodes the non-public display information to transmit to the communication terminal 5/1. The encoder bridge unit 30-2 encodes the public display information to transmit to the communication terminal 5/2. The communication terminal 5/1 displays the non-public display information (the operation data [p1], the operation data [p2], and the content A) received from the delivery managing device 2. The communication terminal 5/2 displays the public display information (the operation data [p2] and the content A) received from the delivery managing device 2.

As described above, in the first site and the second site, it is possible to perform remote sharing processing to share the same information in real time in remote locations, and therefore, the delivery system 1 of the present embodiment is effective for teleconferencing, and the like.

[Detailed Explanation of Embodiment]

Subsequently, an embodiment is explained in detail using FIG. 7 to FIG. 28B.

<Hardware Configuration of Embodiment>

Figure 7:
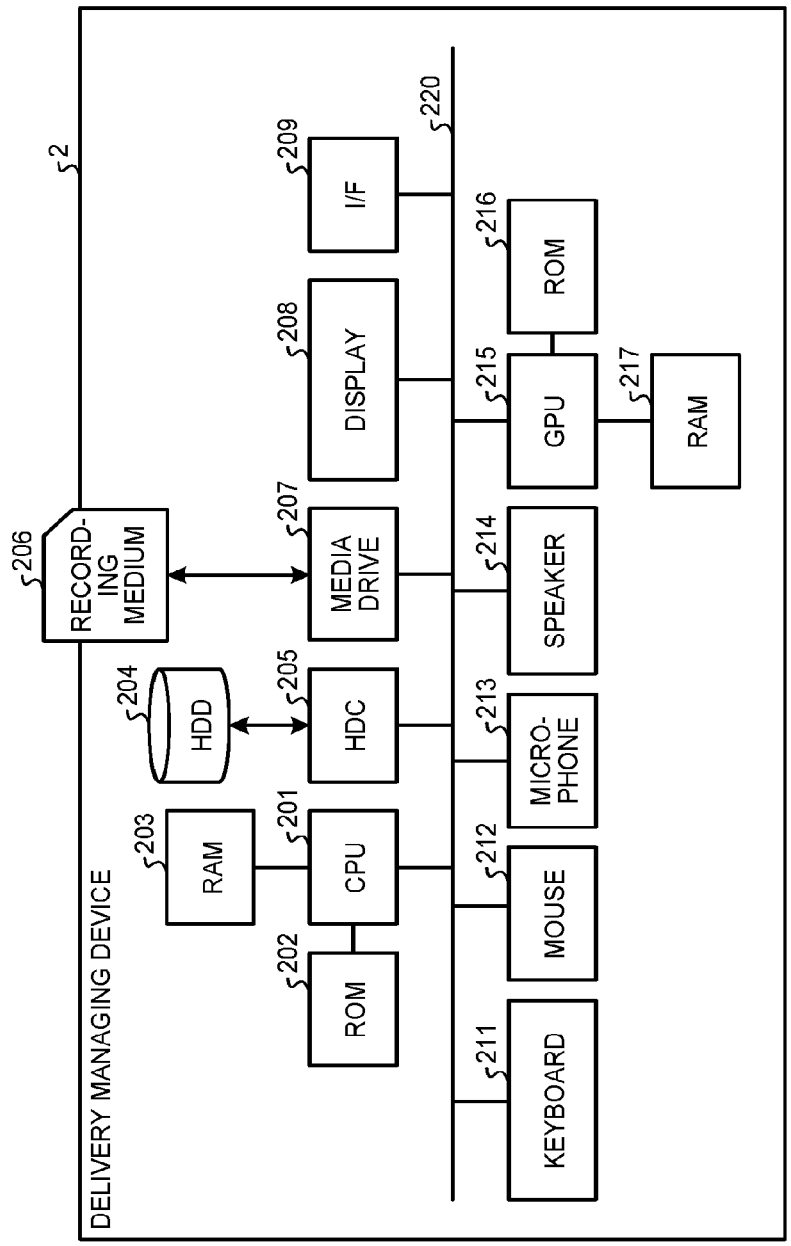
FIG. 7 is a diagram showing one example of a hardware configuration of a delivery managing device.
Figure 8:
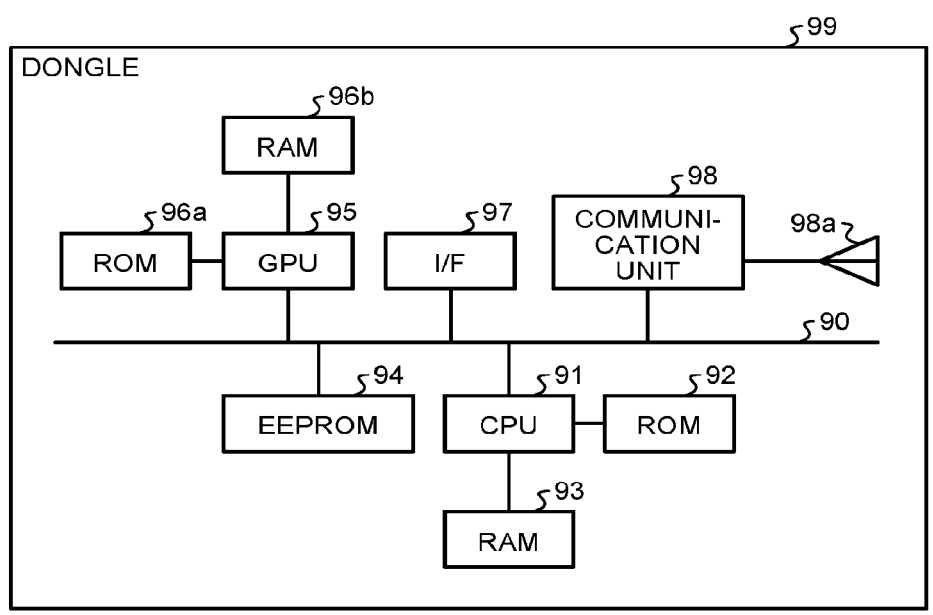
FIG. 8 is a diagram showing one example of a hardware configuration of the dongle.

First, a hardware configuration of the present embodiment is explained using FIG. 7 and FIG. 8. FIG. 7 is a diagram showing one example of a logical hardware configuration of the delivery managing device 2. Moreover, FIG. 8 is a diagram showing one example of a logical hardware configuration of the dongle 99. Because hardware configurations of the communication terminal 5 the terminal managing device 7, and the web server 8 are the same as the hardware configuration of the delivery managing device 2, explanation thereof is omitted.

As shown in FIG. 7, the delivery managing device 2 includes a (host) central processing unit (CPU) 201 that controls operation of the entire delivery managing device 2, a read only memory (ROM) 202 that stores a program, such as an information processing language (IPL), used to drive the CPU 201, a random access memory (RAM) 203 that is used as a work area of the CPU 201, a hard disk drive (HDD) 204 that stores various kinds of data such as a program, a hard disk controller (HDC) 205 that controls read and write of various kinds of data from and to the HDD 204 according to control of the CPU 201, a media drive 207 that controls read and write (storing) of data from and to a recording medium 206 such as a flash memory, a display 208 that displays various kinds of information, an interface (I/F) 209 to transmit data using the communication network 9 or to connect the dongle 99, a keyboard 211, a mouse 212, a microphone 213, a speaker 214, a graphics processing unit (GPU) 215, a ROM 216 that stores a program used to drive the GPU 215, a RAM 217 that is used as a work area of the GPU 215, and an expansion bus line 220 such as an address bus and a data bus, to electrically connect the respective components described above.

Note that programs for the respective communication terminals, the respective systems, or the respective servers may be distributed by recording on a computer-readable recording medium, such as the recording medium 206 described above, in a file of an installable format or an executable format.

Next, a hardware configuration of the dongle 99 is explained using FIG. 8. As shown in FIG. 8, the dongle 99 includes a CPU 91 that controls operation of the entire dongle 99, a ROM 92 that stores a basic input/output program, a RAM 93 that is used as a work area of the CPU 91, an electrically erasable and programmable ROM (EEPROM) 94 that reads and writes data according to control of the CPU 91, a GPU 95, a ROM 96a that stores a program used to drive the GPU 95, a RAM 96b that is used as a work area of the GPU 95, the I/F 97 to connect to the I/F 209 of the communication terminal 5, an antenna 98a, a communication unit 98 that performs communication by short-range wireless technique by using this antenna 98a, and a bus line 90, such as an address bus and a data bus, to electrically connect the respective components described above. As the short-range wireless technique, for example, there are near field communication (NFC) standards, Bluetooth (registered trademark), wireless fidelity (Wi-Fi) (registered trademark), a ZigBee (registered trademark), and the like.

<Functional Configuration of Embodiment>

Figure 9:
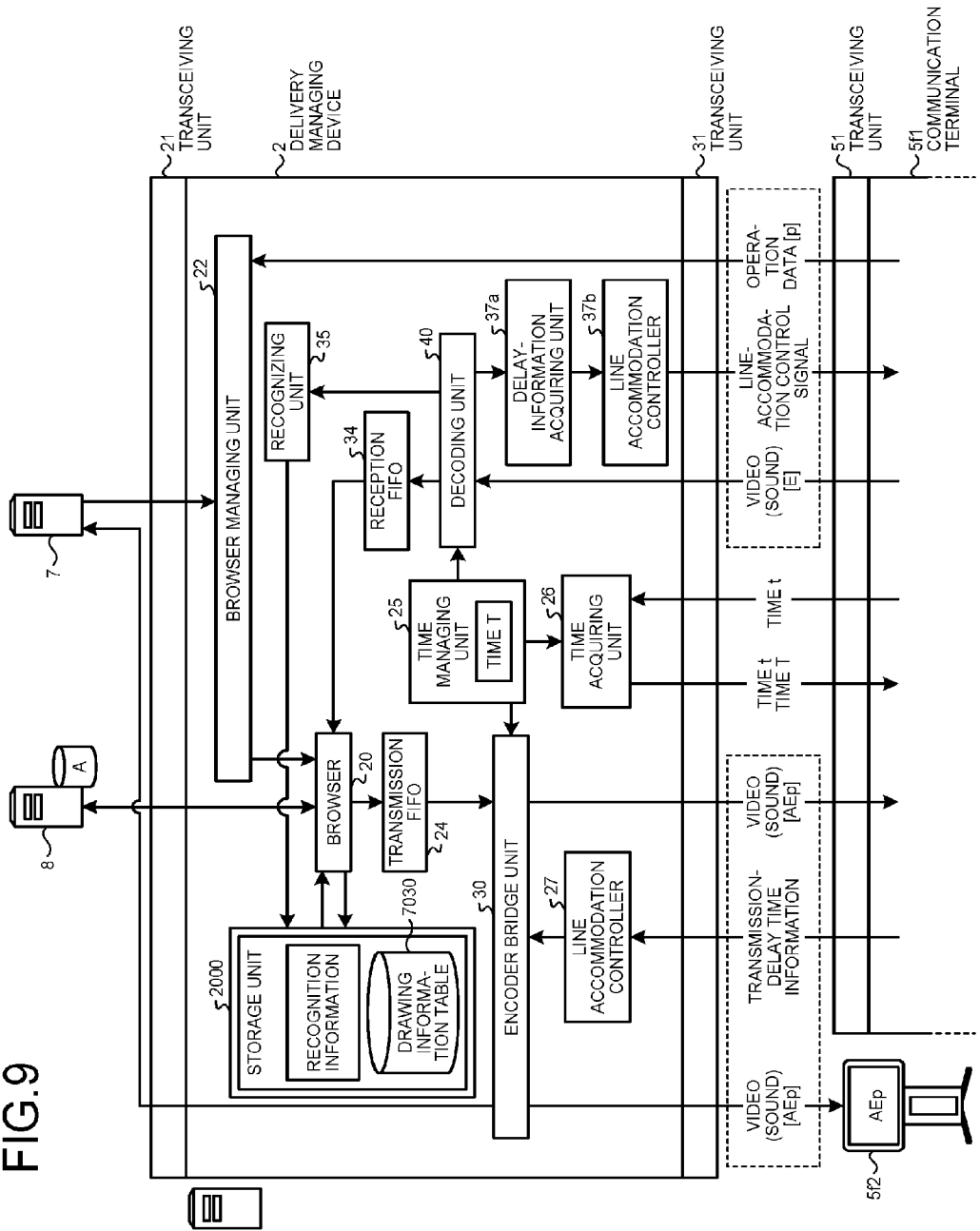
FIG. 9 is a functional block diagram showing respective functions of the delivery managing device mainly.

Next, a functional configuration of the present embodiment is explained using FIG. 9 to FIG. 17. FIG. 9 is a functional block diagram showing respective functions of the delivery managing device 2 mainly. Although a functional configuration when the delivery managing device 2 delivers video (sound) data to the communication terminal 5/1 is shown in FIG. 9, the function configuration is the same also when the delivery destination is other than the communication terminal 5/1. Although the delivery managing device 2 has more than one delivery engine server, for simplicity of explanation, a case of having a single delivery engine server is explained in the following.

(Functional Configuration of Delivery Managing Device)

The delivery managing device 2 implements the respective functional configurations shown in FIG. 9 by the hardware configuration shown in FIG. 7 and a program. Specifically, the delivery managing device 2 has the browser 20, a transceiving unit 21, a browser managing unit 22, a transmission FIFO 24, a time managing unit 25, a time acquiring unit 26, a line accommodation controller 27, the encoder bridge unit 30, a transceiving unit 31, a reception FIFO 34, a recognizing unit 35, a delay-information acquiring unit 37a, a line accommodation controller 37b, and a decoding unit 40. Furthermore, the delivery managing device 2 has a storage unit 2000 that is constituted of the HDD 204 shown in FIG. 7. In this storage unit 2000, identification information described later that is output from the recognizing unit 35 is stored. Note that content date acquired by the browser 20 can also be temporarily stored in the storage unit 2000 as a cache. Moreover, the storage unit 2000 stores a drawing information table 7030.

Figures 10, 11:
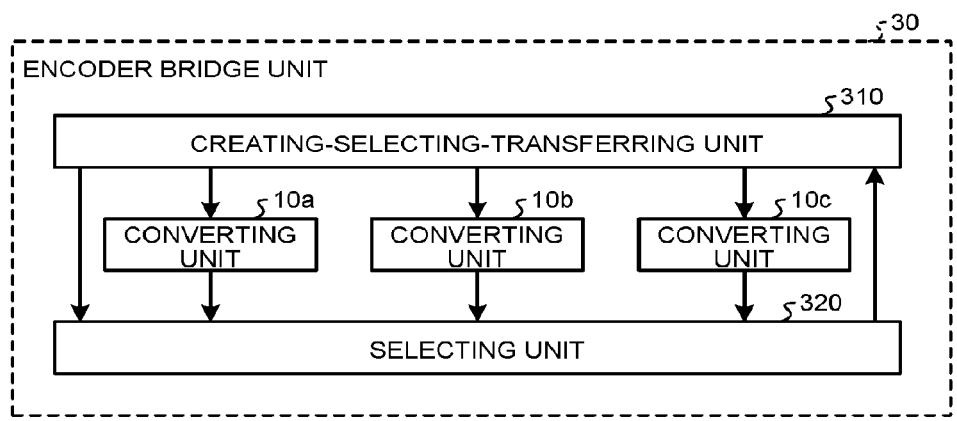
FIG. 10 is a conceptual drawing of a drawing information table.
FIG. 11 is a detailed diagram of an encoder bridge unit.

FIG. 10 is a conceptual drawing of a drawing information table 7030. The drawing information table 7030 stores drawing command information, coordinate information, terminal information, and setting information in an associated manner. Records in the drawing information table 7030 are created by the browser 20 when the browser 20 receives the terminal transmission information (operation data, setting information of operation data, and identification information of a communication terminal). The drawing command information is information indicating a command to draw a pictorial content such as characters and pictures input by operation of an electronic pen. The drawing command information is, for example, information of a command expressing "figure A". The coordinate information is coordinates indicating a position a start point in drawing of one pictorial content. One pictorial content is a content that is drawn during a period from when, for example, an electronic pen comes into contact with (or close to) a display screen of the communication terminal 5f until it is apart therefrom. The coordinate information is, for example, (x1, y1). The terminal information is information indicating a terminal that has transmitted the terminal transmission information. The terminal information is, for example, "5/1". The setting information is setting information (public setting or non-public setting) of operation data included in the terminal transmission information. The setting information is, for example, "non-public".

Among the respective function components described above, the browser 20 is a web browser that operates in the delivery managing device 2. The browser 20 creates video (sound) data as RGB data (or pulse code modulation (PCM) data) by performing rendering of content data such as web content data. The browser 20 is always updated to the latest form so as to support richer web content.

Moreover, in the delivery system 1 of the present embodiment, multiple units of the browsers 20 are prepared in the delivery managing device 2, and a cloud browser to be used for a user session is selected from among these browsers 20. For simplicity of explanation, a case in which a single unit of the browser 20 is prepared is explained below.

The browser 20 has, for example, a media player, a flash player, a JavaScript (registered trademark), a cascading style sheet (CSS), and an HTML renderer. JavaScript (registered trademark) includes a standard one and one specific to the delivery system 1. The media Player is a browser plugin to reproduce a multimedia file such as a video (sound) file in the browser 20. Flash Player is a browser plugin to reproduce a Flash content in the browser 20. The specific JavaScript (registered trademark) is a JavaScript (registered trademark) group that provides application programming interface (API) of a service unique to the delivery system 1. CSS is a technique for effective definition of appearance and a style of a web page that is described in HTML. The HTML renderer is a WebKit-based HTML rendering engine.

The transceiving unit 21 performs transmission and reception of various kinds of data, requests, and the like with the terminal managing device 7 and the web server 8. For example, transceiving unit 21 acquires web content data from a content site of the web server 8.

The browser managing unit 22 performs management of the browser 20 and the encoder bridge unit 30. For example, the browser managing unit 22 instructs start or end thereof to the browser 20 and the encoder bridge unit 30, or numbers an encoder identification (ID) at the time of start or end. The encoder ID is an identification information that is numbered to manage a process of the encoder bridge unit 30 by the browser managing unit 22. Furthermore, the browser managing unit 22 numbers a browser ID each time the browser 20 is started, for management. The browser ID is identification information that is numbered to manage a process of the browser 20, and to identify the browser 20.

Moreover, the browser managing unit 22 acquires various kinds of operation data [p] from the communication terminal 5 through the transceiving unit 31, to output to the browser 20. The operation data [p] is data generated by an operation event (operation by the keyboard 211, the mouse 212, or the like, and strokes with the electronic pen P, and the like) at the communication terminal 5. When various kinds of sensors such as a temperature sensor, a humidity sensor, and an acceleration sensor are provided in the communication terminal 5, the browser managing unit 22 acquires sensor information that is an output signal of each sensor from the communication terminal 5, to output to the browser 20.

The transmission FIFO 24 is a buffer that stores video (sound) data [AEp] created at the browser 20.

The time managing unit 25 manages time T specific to the delivery managing device 2. The time acquiring unit 26 performs processing to adjust time in coordination with a time control unit 56 in the communication terminal 5 described later. Specifically, the time acquiring unit 26 acquires time information (T) indicating time T at the delivery managing device 2 from the time managing unit 25, receives time information (t) indicating time t at the communication terminal 5 from the time control unit 56 described later, and transmits the time information (t) and the time information (T) to the time control unit 56.

The line accommodation controller 27 calculates reproduction delay time U based on transmission-delay time information (D), and calculates an operation condition such as a frame rate and resolution of data of the converting unit 10 described later in the encoder bridge unit 30. This reproduction delay time U is time for delaying reproduction by buffering data before reproduction. That is, the line accommodation controller 27 changes action of the encoder bridge unit 30 based on the transmission-delay time information (D) and data size (the number of bits or the number of bites, and the like). This transmission-delay time information (D) indicates frequency distribution information that is constituted of more than one transmission delay times D1 acquired from a reproduction control unit 53 by a delay-information acquiring unit 57 in the communication terminal 5. The respective transmission delay times D1 indicate time from when video (sound) data is transmitted by the delivery managing device 2 until received by the communication terminal 5.

The encoder bridge unit 30 outputs respective frame data as still image (sound) data that is created by the browser 20 to the converting unit 10 in the encoder bridge unit 30 described later. At this time, the converting unit 10 performs various processing, considering the operation condition calculated by the line accommodation controller 27. The encoder bridge unit 30 is explained in further detail using FIG. 11 and FIG. 12. FIG. 11 is a detailed diagram of the encoder bridge unit 30. Moreover, FIG. 12 is a functional block diagram showing respective functions of the converting unit 10.

As shown in FIG. 11, the encoder bridge unit 30 includes a creating-selecting-transferring unit 310, a selecting unit 320, and converting units 10a, 10b, and 10c that are built therebetween. Although three units of the converting units 10a, 10b, and 10c are shown in this example, any number of the converting units may be prepared. In the following, an arbitrary converting unit is indicated as "converting unit 10".

Figure 12:
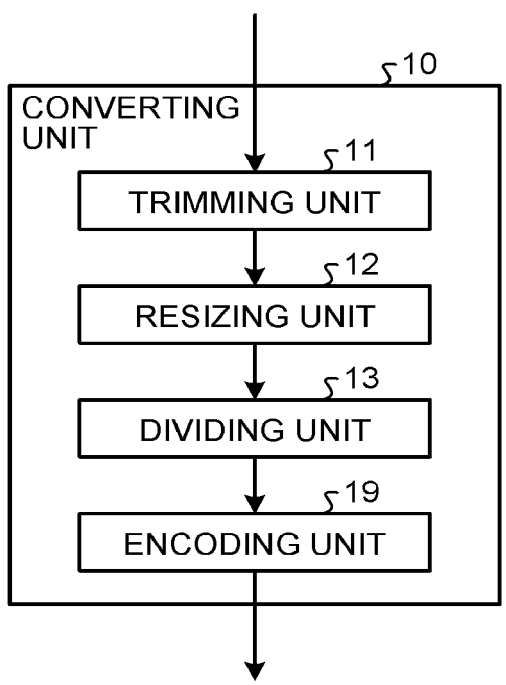
FIG. 12 is a functional block diagram showing respective functions of a converting unit.

Furthermore, the converting unit 10 includes a trimming unit 11, a resizing unit 12, a dividing unit 13, and the encoding unit 19 as shown in FIG. 12. The trimming unit 11, resizing unit 12, and the dividing unit 13 do not perform processing for sound data.

The trimming unit 11 performs processing of cutting out only a part of a video (image). The resizing unit 12 changes the scale of a video (image). The dividing unit 13 divides a web content that is acquired from the web server 8 as shown in FIG. 4.

The encoding unit 19 encodes video (sound) data that is created at the browser 20, and thereby converts the video (sound) data so that the video (sound) data can be delivered to the communication terminal 5 through the communication network 9. Moreover, the encoding unit 19 inserts, if video is not moving (if there is no update (change) among frames) skip frame (also referred to as "frame skip") data until the video moves, thereby saving a band. When sound data is created together with still image data by rendering, both data are encoded. However, when only sound data is created, trimming, resizing, and division are not performed, and only encoding is performed to compress the data.

The creating-selecting-transferring unit 310 newly creates the converting unit 10, or selects video (sound) data to be input to the converting unit 10 that has already been created. As a case in which the creating-selecting-transferring unit 310 newly creates the converting unit 10, for example, there is a case in which the converting unit 10 capable of performing conversion that meets the reproduction performance for video (sound) data of the communication terminal 5 is to be created, and the like. Furthermore, in a case in which the creating-selecting-transferring unit 310 selects video (sound) data to be input to the converting unit 10, the converting unit 10 that has already been created is to be selected. For example, when delivery to the communication terminal 5b is started in addition to delivery to the communication terminal 5a, there is a case in which video (sound) data same as the video (sound) data that is being delivered to the communication terminal 5a is delivered to the communication terminal 5b. A case in which the communication terminal 5b has the same reproduction performance as the reproduction performance for video (sound) data in the communication terminal 5a in such a case, and the like corresponds to this. That is, in such a case, the creating-selecting-transferring unit 310 does not create a new converting unit 10b for the communication terminal 5b, but uses a converting unit 10a that has already been created for the communication terminal 5a.

The selecting unit 320 selects a desired one from among the converting units 10 already been created. Selection made by the creating-selecting-transferring unit 310 and the selecting unit 320 enables various patterns of delivery.

Returning back to FIG. 9, the transceiving unit 31 performs transmission and reception of various kinds of data, request, and the like with the communication terminal 5. For example, in login processing of the communication terminal 5, the transceiving unit 31 transmits verification screen data to prompt a user to make a login request, to a transceiving unit 51 of the communication terminal 5 described later. Other than that, the transceiving unit 31 performs data transmission and data reception to and from an application program (a user application or a device application) that is installed in the communication terminal 5 to receive a service of the delivery system 1 by a protocol specific to the delivery system 1 through a hypertext transfer protocol over secure socket layer (HTTPS) server. This specific protocol is an application layer protocol based on HTTPS to transmit and receive data in real time without interruption between the delivery managing device 2 and the communication terminal 5. Furthermore, the transceiving unit 31 performs respective processing of transmission response control, real-time data creation, command transmission, reception response control, reception data analysis, and gesture conversion.

The transmission response control is processing of managing an HTTPS session for download requested by the communication terminal 5, to transmit data to the communication terminal from the delivery managing device 2. A response of this HTTPS session for download does not end soon but is maintained for a predetermined time (1 to several minutes). The transceiving unit 31 writes data to transmit to the communication terminal 5 dynamically in a body of the response. Furthermore, to save a cost of reconnection, another request is to be delivered from the communication terminal 5 before a previous session ends. By keeping the transceiving unit 31 in standby until a previous request is completed, overhead can be eliminated even if reconnection is performed.

Real-time data creation is processing of adding a specific header to data (RTP data) of compressed video (and compressed sound) data that is created at the encoding unit 19 in FIG. 12 to write in a body of downlink HTTPS to the communication terminal 5.

The command transmission is processing of creating a command data to transmit to the communication terminal 5 to write in a body of HTTPS for delivery (downlink) to the communication terminal 5.

The reception response control is processing of managing an HTTPS session for transmission (uplink) requested by the communication terminal 5 for the delivery managing device 2 to receive data from the communication terminal 5. A response of this HTTPS session does not end soon but is maintained for a predetermined time (1 to several minutes). The communication terminal 5 writes data to transmit to the transceiving unit 31 dynamically in a body of the response.

The reception data analysis is processing of analyzing data that is transmitted from the communication terminal 5 for every type, and of transferring the data to a necessary process.

The gesture conversion is processing of converting a gesture event that is input by a user with the electronic pen P or hand to the communication terminal 5f as an electronic blackboard into a format receivable for the browser 20.

The reception FIFO 34 is a buffer that stores video (sound) data that is decoded by the decoding unit 40.

The recognizing unit 35 performs processing on video (sound) data [E] that is received from the communication terminal 5. Specifically, the recognizing unit 35 recognizes a face of a human or an animal, an age, a sex, and the like, for example, from video imaged for signage by a camera 62 described later. Moreover, for offices, the recognizing unit 35 performs name tagging by face recognition from video imaged by the camera 62 described later, background-image replacement processing, and the like. The recognizing unit 35 stores recognition information indicating recognized information in the storage unit 2000. This recognizing unit 35 can achieve high speed processing by performing the processing with a recognition expansion board.

The delay-information acquiring unit 37a is used for processing of uplink line accommodation control corresponding to the delay-information acquiring unit 57 on the communication terminal 5 side used for processing of downlink line accommodation control. Specifically, the delay-information acquiring unit 37a acquires transmission-delay time information (d1) indicating a transmission delay time d1 from the decoding unit 40 and holds for a predetermined time, and when multiple pieces of the transmission-delay time information (d1) are acquired, outputs transmission-delay time information (d) indicating frequency distribution information with multiple transmission-delay times d1, to the line accommodation controller 37b. The transmission-delay time information (d1) indicates time from when video (sound) data is transmitted by the communication terminal 5 until when the data is received by the delivery managing device 2.

The line accommodation controller 37b is used for processing of uplink line accommodation control corresponding to the line accommodation controller 27 described above that is used for the processing of downlink line accommodation control. Specifically, the line accommodation controller 37b calculates an operation condition of an encoding unit 60 on the communication terminal 5 side based on the transmission-delay time information (d). Moreover, the line accommodation controller 37b transmits a line-accommodation control signal indicating the operation condition such as a frame rate and a resolution of data to the encoding unit 60 of the communication terminal 5 through the transceiving unit 31 and the transceiving unit 51 described later.

The decoding unit 40 decodes the video (sound) data [E] that has been transmitted from the communication terminal 5. Furthermore, the decoding unit 40 outputs the transmission-delay time information (d1) indicating the transmission delay time d1 to the delay-information acquiring unit 37a.

(Functional Configuration of Communication Terminal)

Figure 13:
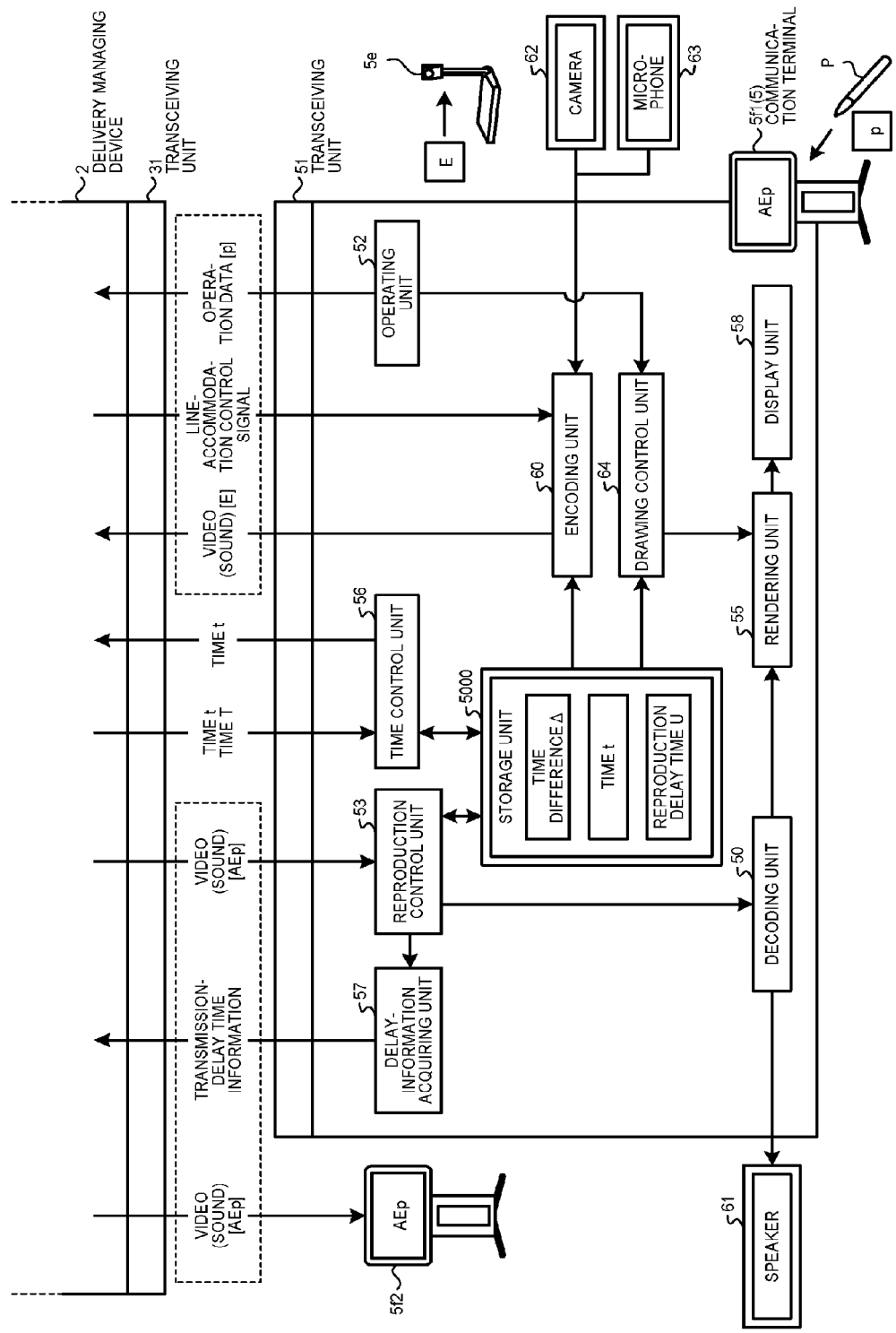
FIG. 13 is a functional block diagram showing respective functions of a communication terminal mainly.

Subsequently, a functional configuration of the communication terminal 5 is explained using FIG. 13. FIG. 13 is a functional block diagram showing respective functions of the communication terminal 5 mainly. Although the communication terminal 5f1 is exemplified as one of the communication terminals 5 in FIG. 13, the communication terminal 5 other than the communication terminal 5f1 also has the same functional configuration. The communication terminal 5 in which a user application has been installed out of the communication terminals 5 is to be an interface for a user to perform login to the delivery system 1, start or stop of delivery of video (sound) data, and the like. On the other hand, the communication terminal 5 in which a device application has been installed only performs transmission and reception of video (sound) data or transmission of operation data, and has no interface described above. In the following, explanation is given assuming that a user application is installed in the communication terminal 5, for convenience' sake.

The communication terminal 5 implements the respective functional configurations shown in FIG. 13 by a hardware configuration and a program (user application) similar to those in FIG. 7. Specifically, the communication terminal 5 has the decoding unit 50, the transceiving unit 51, an operating unit 52, the reproduction control unit 53, a rendering unit 55, the time control unit 56, the delay-information acquiring unit 57, a display unit 58, the encoding unit 60, and a drawing control unit 64. Furthermore, the communication terminal 5 has a storage unit 5000 that is built with the RAM 203 shown in FIG. 7. In this storage unit 5000, time difference information ($\Delta$) indicating a time difference $\Delta$ described later, the time information (t) indicating time t at the communication terminal 5 are stored.

The decoding unit 50 decodes the video (sound) data [AEp] that has been delivered by the delivery managing device 2 and is output from the reproduction control unit 53.

The transceiving unit 51 performs transmission and reception of various kinds of data, requests, and the like with the transceiving unit 31 of the delivery managing device 2 and a transceiving unit 71a of the terminal managing device 7 described later. For example, the transceiving unit 51 performs a login request to the transceiving unit 71a of the terminal managing device 7 based on activation of the communication terminal 5 by the operating unit 52 in login processing of the communication terminal 5.

The operating unit 52 performs processing of accepting an operation input of a user. For example, the operating unit 52 accepts an input, selection, and the like made with a power switch, a keyboard, a mouse, the electronic pen P, and the like, and transmits as the operation data [p] to the browser managing unit 22 of the delivery managing device 2. Moreover, the operating unit 52 transmits the operation data [p] to the drawing control unit 64.

The reproduction control unit 53 performs buffering on the video (sound) data [AEp] (real-time data packet) received from the transceiving unit 51, to output to the decoding unit 50 considering the reproduction delay time U. The reproduction delay time U is received from the delivery managing device 2 by the transceiving unit 51, and is informed to the reproduction control unit 53. The reproduction control unit 53 stores the reproduction delay time U in the storage unit 5000. Moreover, the reproduction control unit 53 calculates the transmission-delay time information (D1) indicating the transmission delay time D1 to output to the delay-information acquiring unit 57.

The rendering unit 55 performs rendering of data that has been decoded by the decoding unit 50.

The time control unit 56 performs processing of time adjustment in coordination with the time acquiring unit 26 of the delivery managing device 2. Specifically, the time control unit 56 acquires the time information (t) indicating a time t at the communication terminal 5 from the storage unit 5000. Furthermore, the time control unit 56 requests the time acquiring unit 26 of the delivery managing device 2 for the time information (T) indicating a time T at the delivery managing device 2 through the transceiving unit 51 and the transceiving unit 31. In this case, the time information (t) is transmitted together with the request for the time information (T).

The delay-information acquiring unit 57 acquires the transmission-delay time information (D1) indicating the transmission delay time D1 from the reproduction control unit 53 and holds for a predetermined time, and when multiple pieces of the transmission-delay time information (D1) are acquired, transmits the transmission-delay time information (D) indicating the frequency distribution with the transmission delay times D1 to the line accommodation controller 27 through the transceiving unit 51 and the transceiving unit 31. Note that the transmission-delay time information (D) is transmitted once in 100 frames, for example.

The display unit 58 reproduces the data that has been rendered by the rendering unit 55.

The encoding unit 60 transmits the video (sound) data [E] that is acquired from the internal microphone 213 (refer to FIG. 7), or the external camera 62 and microphone 63, and then encoded, time information (t0) that is acquired from the storage unit 5000 indicating time t0 at the communication terminal 5 at a current point, and the time difference information (Δ) that is acquired also from the storage unit 5000 indicating the time difference Δ to the decoding unit 40 of the delivery managing device 2 through the transceiving unit 51 and the transceiving unit 31. The time difference Δ is a difference between the time T managed by the delivery managing device 2 on its own and the time t that is managed by the communication terminal 5 on its own. Moreover, the encoding unit 60 changes the operation condition of the encoding unit 60 based on the operation condition indicated by the line-accommodation control signal that is received from the line accommodation controller 37b. Furthermore, when the operation condition is changed, the encoding unit 60 transmits the video (sound) data [E] that is acquired from the camera 62 and the microphone 63, the time information (t0) indicating the time t0 at the communication terminal 5 at the current time acquired from the storage unit 5000, and the time difference information (Δ) indicating the time difference Δ acquired from the storage unit 5000 to the decoding unit 40 of the delivery managing device 2 through the transceiving unit 51 and the transceiving unit 31, according to the new operation condition.

Note that the internal microphone 213, and the external camera 62 and microphone 63 are one example of the input unit, and are various kinds of devices that require encoding and decoding. The input unit may be able to output touch data or smell data other than video (sound) data.

The input unit includes various kinds of sensors such as a temperature sensor, a direction sensor, and an acceleration sensor. In FIG. 13, an example in which the communication terminal 5e as a videoconference terminal is connected to the communication terminal 5f1 as an electronic black board, and a camera and a microphone of the communication terminal 5e is used as the external camera 62 and microphone 63 of the communication terminal 5f1 is shown.

The drawing control unit 64 receives the operation data [p] from the operating unit 52. The drawing control unit 64 instructs the rendering unit 55 to perform rendering based on the operation data [p]. Thus, the display unit 58 temporarily displays drawing information based on the operation data [p] until the public display information or non-public display information described above that includes the drawing information based on the operation data [p] is received from the delivery managing device 2 and displayed on the communication terminal 5f1. Hereinafter, the drawing information that is drawn temporarily based on the operation data [p] is referred to as "local drawing information". Moreover, the drawing control unit 64 reads the reproduction delay time U from the storage unit 5000, and instructs the rendering unit 55 to delete the local drawing information when a display scheduled time of the public display information or the non-public display information comes.

(Functional Configuration of Terminal Managing Device)

Figure 14:
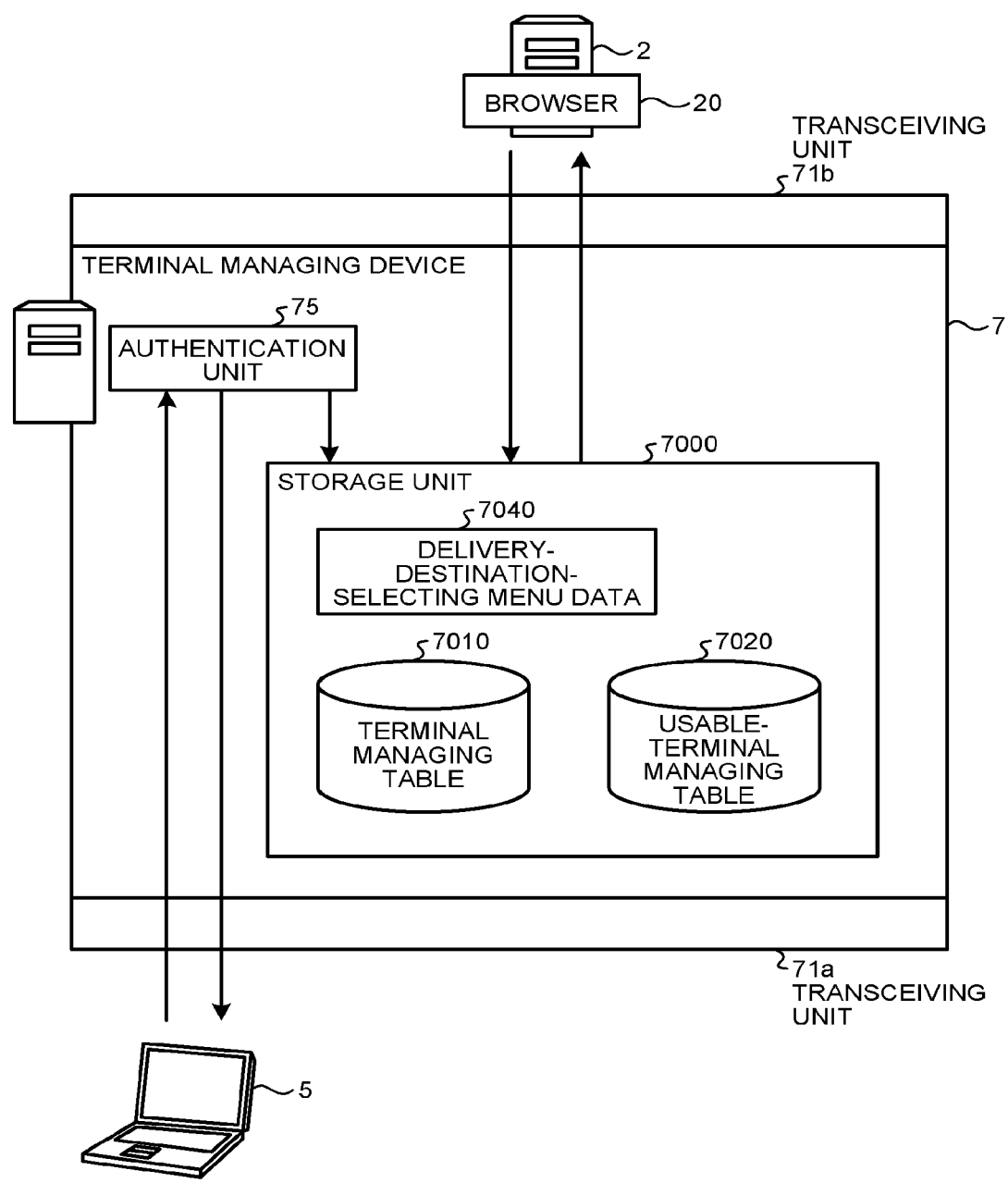
FIG. 14 is a functional block diagram showing respective functions of a terminal managing device.

Subsequently, a functional configuration of the terminal managing device 7 is explained using FIG. 14. FIG. 14 is a functional block diagram showing respective functions of the terminal managing device 7.

The terminal managing device 7 implements respective functional components shown in FIG. 14 by the same hardware configuration as that in FIG. 7 and a program.

Specifically, the terminal managing device 7 has the transceiving unit 71a, a transceiving unit 71b, and an authentication unit 75. Furthermore, the terminal managing device 7 has a storage unit 7000 constituted of the HDD 204 shown in FIG. 7. In this storage unit 7000, a delivery-destination-selecting menu data 7040, a terminal managing table 7010, and a usable-terminal managing table 7020 are stored.

A delivery-destination-selecting menu is data that shows a delivery-destination-selecting menu screen as shown in FIG. 15. FIG. 15 is a conceptual drawing of the delivery-destination-selecting menu screen. In this delivery-destination-selecting menu screen shown in FIG. 15, for the communication terminals 5 selectable as a delivery destination of video (sound) data, shared IDs and display names described later are displayed in list form. On this delivery-destination-selecting menu screen, by checking an item of the communication terminal 5 that is desired to be the delivery destination of video (sound) data, and pressing an "OK" button, a user can have the video (sound) data delivered to the desired communication terminal 5.

FIG. 16 is a conceptual drawing of the terminal managing table 7010. In the terminal managing table 7010, as shown in FIG. 16, terminal IDs of the registered communication terminals 5, user certificates, contract information when a user uses the service of the delivery system 1, terminal types of the communication terminals 5, setting information indicating home uniform resource locators (URL) of the respective communication terminals 5, operation environment information of the respective communication terminals 5, shared IDs, installed location information, and display name information are managed in an associated manner. Among these, in the operation environment information, "favorite", "previous cookie information", and "cache file" of the respective terminals 5 are included, and are transmitted to the delivery managing device 2 together with the setting information after login of the respective communication terminals 5, to be used to provide services customized for the respective communication terminals 5.

Moreover, the shared ID is ID that is used when remote share processing is performed by delivering video (sound) data same as the video (sound) data delivered to the own communication terminal 5 to the other communication terminal 5, and is identification information to identify the other communication terminal or the other communication terminal group. In the example shown in FIG. 16, a shared ID of a terminal ID "t006" is "v006", and a shared ID of a terminal ID "t007" is "v006", and a shared ID of a terminal ID "t008" is "v006". Furthermore, when a request for remote share processing with the communication terminals 5f1, 5f2, and 5f3 of the shared ID "v006" is made from the communication terminal 5a of the terminal ID "t001", the delivery managing device 2 delivers video (sound) data same as video (sound) data that is being delivered to the communication terminal 5a to the communication terminals 5f1, 5f2, and 5f3. However, when resolutions of the display units 58 of the communication terminals 5f1, 5f2, and 5f3 differ from each other, the delivery managing device 2 delivers the video (sound) data according thereto.

The installed location information indicates an installed location when multiple units of the communication terminals 5f1, 5f2, and 5f3 are arranged in an aligned manner, for example, as shown in FIG. 4. The display name information is information indicating a display name in the delivery-destination-selecting menu screen shown in FIG. 15.

FIG. 17 is a conceptual drawing of the usable-terminal managing table 7020. In the usable-terminal managing table 7020, for every terminal ID, shared IDs indicating other communication terminals or other communication terminal group with which the communication terminal 5 indicated by the terminal ID can perform remote sharing processing are managed in an associated manner.

Next, returning back to FIG. 14, respective function components are explained.

The transceiving unit 71*a* performs transmission and reception of various kinds of data, requests, and the like with the communication terminal 5. For example, the transceiving unit 71*a* receives a login request from the transceiving unit 51 of the communication terminal 5, and transmits an authentication result for the log request to the transceiving unit 51.

The transceiving unit 71*b* performs transmission and reception of various kinds of data, requests, and the like with the delivery managing device 2. For example, the transceiving unit 71*b* receives a request for data of the delivery destination selecting menu from the transceiving unit 21 of the delivery managing device 2, and transmits data of the delivery-destination selecting menu to the transceiving unit 21.

The authentication unit 75 determines, based on the terminal ID and the user certificate received from the transceiving unit 51 of the communication terminal 5, whether the same combination of the terminal ID and the user certificate is present by searching the terminal managing table 7010, thereby performing the authentication of the communication terminal 5.

[Operation and Processing of Embodiment]

Subsequently, operation or processing of the present embodiment is explained using FIG. 18 to FIG. 25.

<Basic Delivery Processing>

Figure 18:
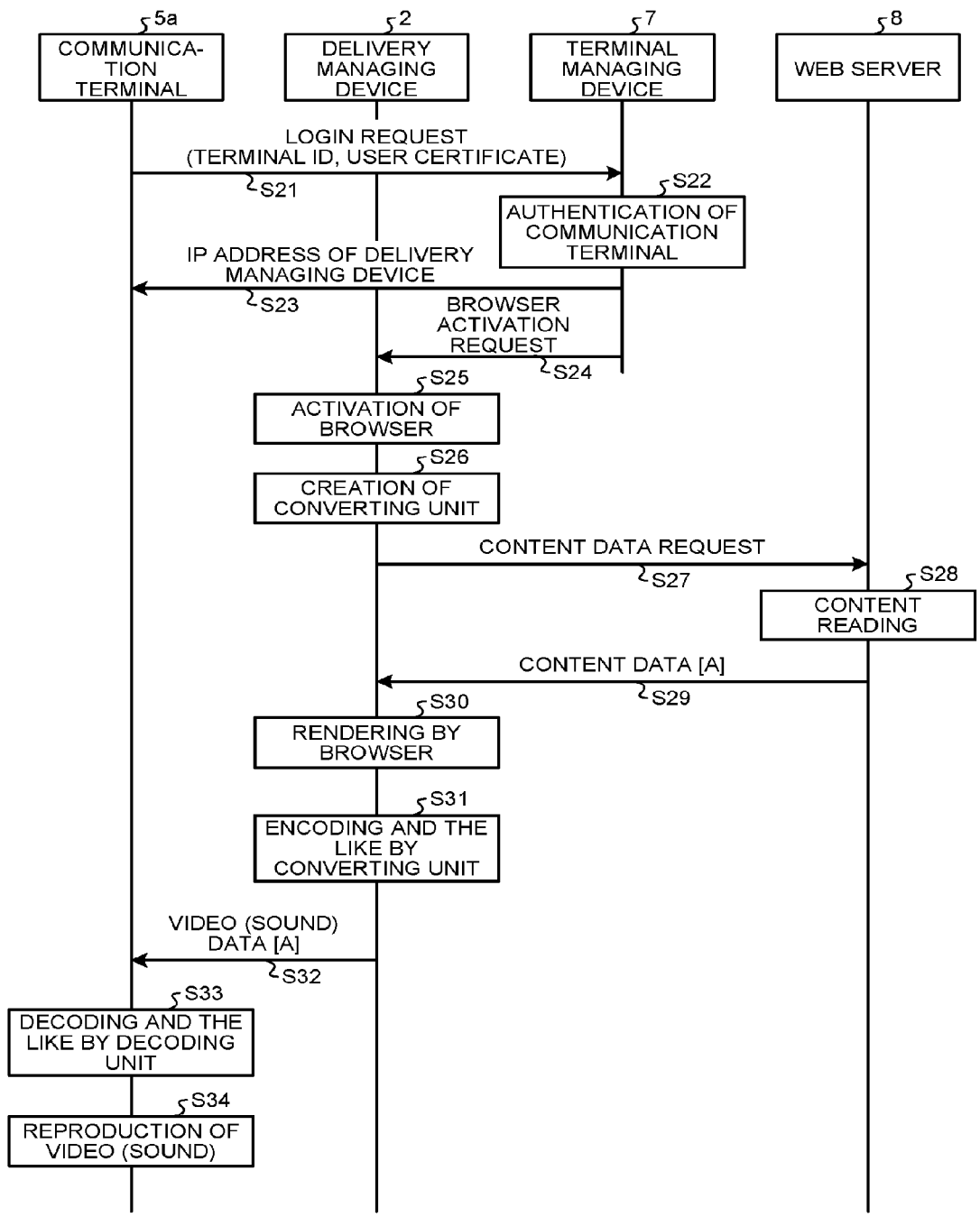
FIG. 18 is a sequence diagram showing basic delivery processing of the delivery managing device.

First, specific delivery processing in the basic delivery method shown in FIG. 3 is explained, using FIG. 18. FIG. 18 is a sequence diagram showing basic delivery processing of the delivery managing device 2. Although a case in which a login request is made using the communication terminal 5*a* is explained here, it may be logged in using the communication terminal 5 other than the communication terminal 5*a*.

As shown in FIG. 18, when a user turns on the communication terminal 5*a*, the transceiving unit 51 of the communication terminal 5*a* transmits a login request to the transceiving unit 71*a* of the terminal managing device 7 (step S21). Thus, the transceiving unit 71*a* of the terminal managing device 7 receives the login request to output to the authentication unit 75. In this login request, a terminal ID of the communication terminal 5*a* and a user certificate are included. Therefore, the authentication unit 75 acquires the terminal ID and the user certificate of the communication terminal 5*a*.

Next, the authentication unit 75 of the terminal managing device 7 determines, based on the terminal ID and the user certificate received from the communication terminal 5*a*, whether the same combination of the terminal ID and the user certificate is present by searching the terminal managing table 7010, thereby performing authentication of the communication terminal 5*a* (step S22). Here, a case in which the same combination of the terminal ID and the user certificate is present in the terminal managing table 7010, that is, when the communication terminal 5*a* is authenticated as a proper terminal in the delivery system 1, is explained in the following.

Next, the transceiving unit 71*a* of the terminal managing device 7 transmits an IP address of the delivery managing device 2 to the transceiving unit 51 of the communication terminal 5*a* (step S23). The IP address of the delivery managing device 2 is acquired from the delivery managing device 2 by the terminal managing device 7 and stored in the storage unit 7000 in advance.

Next, the transceiving unit 71*b* of the terminal managing device 7 makes an activation request of the browser 20 to the transceiving unit 21 of the delivery managing device 2 (step S24). Thus, the transceiving unit 21 receives the activation request of the browser 20. The browser managing unit 22 activates the browser 20 based on the activation request received by the transceiving unit 21 (step S25). Next, the creating-selecting-transferring unit 310 of the encoder bridge unit 30 creates the converting unit 10 according to the reproduction performance (resolution of the display, and the like) of the communication terminal 5*a* and a type of a content (step S26).

Next, the transceiving unit 21 requests the web server 8 for the content data [A] according to an instruction of the browser 20 (step S27). In response to this, the web server 8 reads the requested content data [A] from a storage unit (not shown) thereof (step S28). The web server 8 transmits the content data [A] to the transceiving unit 21 of the delivery managing device 2 (step S29).

Next, the browser 20 creates respective frame data as still image (sound) data [A] by performing rendering of the content data [A] received by the transceiving unit 21, to output to the transmission FIFO 24 (step S30). The converting unit 10 then encodes the frame data stored in the transmission FIFO 24, to convert into the video (sound) data [A] to be delivered to the communication terminal 5*a* (step S31)

Next, the transceiving unit 31 transmits the video (sound) data [A] to the transceiving unit 51 of the communication terminal 5*a* (step S32). Thus, the transceiving unit 51 of the communication terminal 5*a* receives the video (sound) data [A], to output to the reproduction control unit 53.

Next, in the communication terminal 5*a*, the decoding unit 50 acquires the video (sound) data [A] from the reproduction control unit 53 to perform decoding (step S33). Thereafter, the speaker 61 reproduces sound based on decoded sound data [A], and the display unit 58 reproduces video based on video data [A] that has been acquired from the decoding unit 50 and rendered by the rendering unit 55 (step S34).

<Processing of Time Adjustment>

Figure 19:
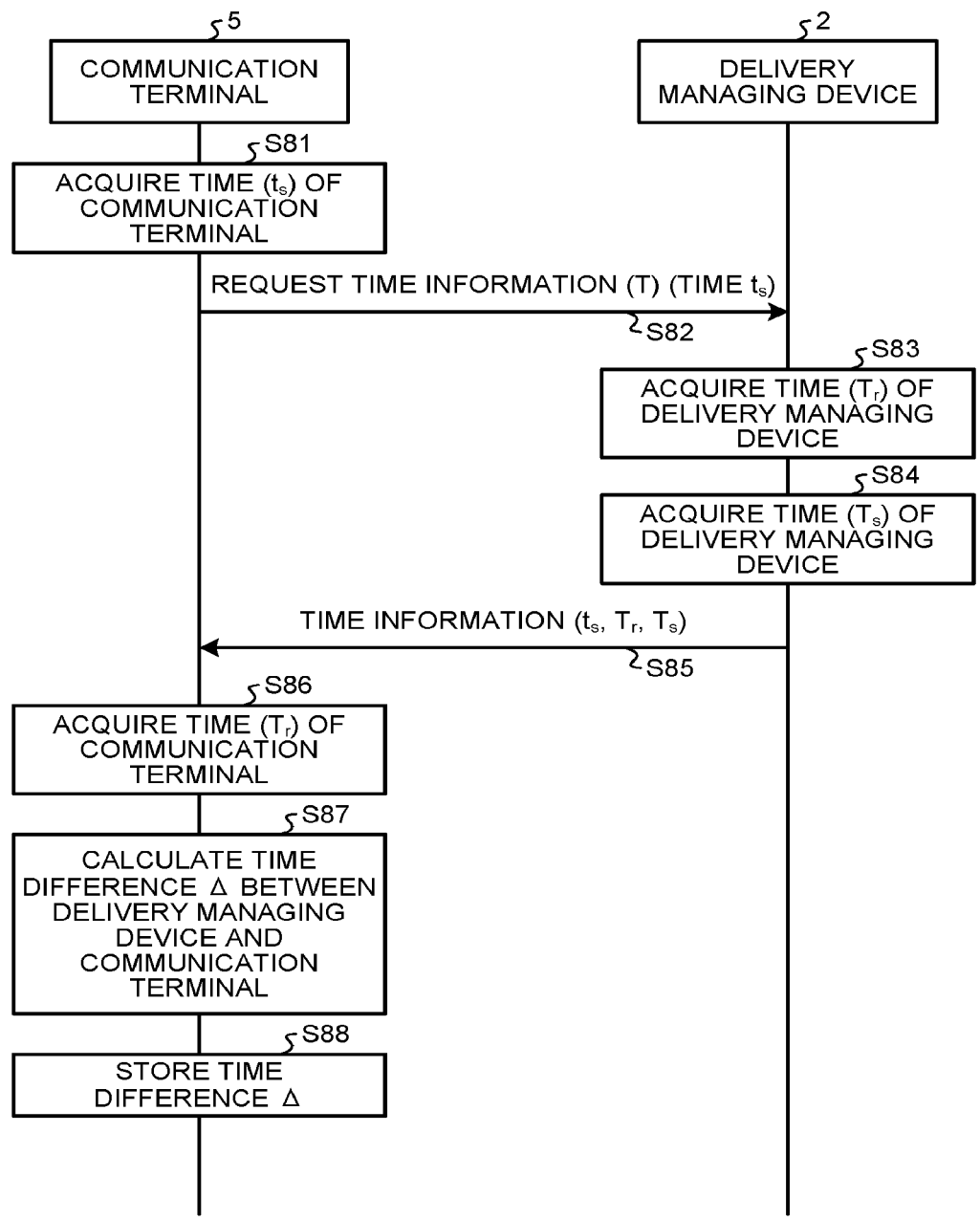
FIG. 19 is a sequence diagram showing time adjustment processing that is performed between the delivery managing device and a communication terminal.

Subsequently, processing of time adjustment is explained using FIG. 19. FIG. 19 is a sequence diagram showing processing of the time adjustment performed between the delivery managing device 2 and the communication terminal 5.

First, the time control unit 56 of the communication terminal 5 acquires time information ($t_s$) at the communication terminal 5 from the storage unit 5000 to acquire time indicating a point of time when the transceiving unit 51 requests the delivery managing device 2 for time information (T) (step S81). The transceiving unit 51 then requests the transceiving unit 31 for the time information (T) at the delivery managing device 2 (step S82). In this case, the time information ($t_s$) is transmitted together with a request for the time information (T).

Next, the time acquiring unit 26 of the delivery managing device 2 acquires time information ($T_r$) at the delivery managing device 2 from the time managing unit 25 to acquire time indicating a point of time when the transceiving unit 31 receives the request made at above step S82 (step S83). Furthermore, the time acquiring unit 26 acquires the time information ($T_s$) at the delivery managing device 2 from the time managing unit 25 to acquire time indicating a point of time when the transceiving unit 31 responds to the request made at above step S82 (step S84). The transceiving unit 31 then transmits time information ($t_s$, $T_r$, $T_s$) to the transceiving unit 51 (step S85).

The time control unit 56 of the communication terminal 5 acquires time information ($t_r$) at the communication terminal 5 from the storage unit 5000 to acquire time indicating a point of time when the transceiving unit 51 receives the response made at above step S85 (step S86).

The time control unit 56 of the communication terminal 5 calculates a time difference $\Delta$ between the delivery managing device 2 and the communication terminal 5 (step S87). This time difference $\Delta$ is expressed by following Equation (1).

$$\Delta = ((T_r + T_s)/2) - ((t_r + t_s)/2) \quad (1)$$

The time control unit 56 then stores time difference information ($\Delta$) indicating time difference data $\Delta$ in the storage unit 5000 (step S88). A series of time adjustment processing is performed, for example, every minute periodically.

<Processing of Downlink Line Accommodation Control>

Figure 20:
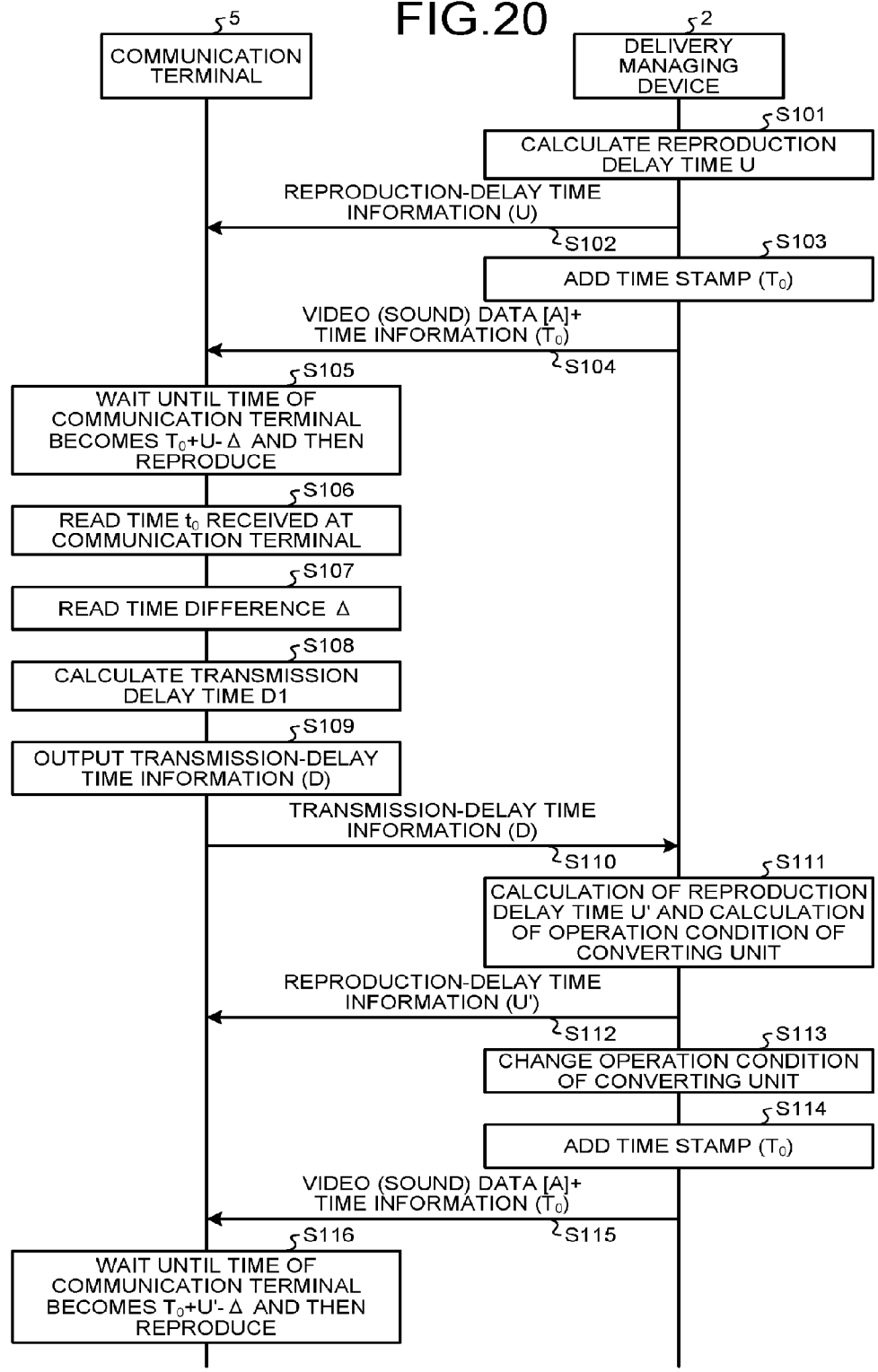
FIG. 20 is a sequence diagram showing processing of line accommodation control for data transmitted from the delivery managing device to a communication terminal.

Subsequently, processing of line accommodation control of (downlink) data transmitted from the delivery managing device 2 to the communication terminal 5 is explained using FIG. 20. FIG. 20 is a sequence diagram showing processing of line accommodation control of data transmitted from the delivery managing device 2 to the communication terminal 5.

First, the line accommodation controller 27 calculates the production-delay time information (U) indicating the reproduction delay time (U) to delay reproduction by performing buffering before the reproduction control unit 53 of the communication terminal 5 reproduces video (sound) data, to output to the encoder bridge unit 30 (step S101).

Next, the transceiving unit 31 acquires the reproduction-delay time information (U) from the encoder bridge unit 30, and transmits the reproduction-delay time information (U) to the transceiving unit 51 of the communication terminal 5 (step S102). Thus, the transceiving unit 51 of the communication terminal 5 receives the reproduction-delay time information (U). Moreover, the encoder bridge unit 30 adds time information ($T_0$) indicating time $T_0$ that indicates a point of time of acquisition from the time managing unit 25, to the video (sound) data [A] that has been acquired from the transmission FIFO 24 and processed by encoding and the like, as a time stamp (step S103). The transceiving unit 31 transmits the video (sound) data and the time information ($T_0$) of the delivery managing device 2 to the transceiving unit 51 of the communication terminal 5 (step S104). Thus, the transceiving unit 51 of the communication terminal 5 receives the video (sound) data and the time information ($T_0$) of the delivery managing device 2, and outputs the video (sound) data and the time information ($T_0$) to the reproduction control unit 53.

Next, in the communication terminal 5, the reproduction control unit 53 waits until a time ($T_0 + U - \Delta$) comes based on the reproduction-delay time information (U) acquired at above step S102, the time information ($T_0$) acquired at above step S104, and the time difference information ($\Delta$) stored in the storage unit 5000 at step S88 in FIG. 19, to output the video (sound) data to the decoding unit 50, thereby causing the speaker 61 to reproduce sound, and the display unit 58 to reproduce video through the rendering unit 55 (step S105). Thus, only the video (sound) data received by the communication terminal 5 is to be reproduced within a range of the reproduction time U expressed in Equation (2) below, and because video (sound) data out of the range is delayed too much, it is deleted without being reproduced.

$$U \geq (t_0 + \Delta) - T_0 \quad (2)$$

Moreover, the reproduction control unit 53 reads, from the storage unit 5000, the time $t_0$ at a current time in the communication terminal 5 (step S106). This time $t_0$ indicates a time at the communication terminal 5 at the time when video (sound) data is received from the delivery managing device 2 by the communication terminal 5. Furthermore, the reproduction control unit 53 reads the time difference information ($\Delta$) indicating the time difference $\Delta$ that is stored at step S88 in FIG. 19 from the storage unit 5000 (step S107). The reproduction control unit 53 then calculates the transmission delay time D1 indicating time from the video (sound) data is transmitted from the delivery managing device 2 until received by the communication terminal 5 (step S108). This calculation is done by Equation (3) below. When the communication network 9 is busy, the transmission delay time D1 is to be long.

$$D1 = (t_0 + \Delta) - T_0 \quad (3)$$

Next, the delay-information acquiring unit 57 acquires the transmission-delay time information (D1) indicating the transmission delay time D1 from the reproduction control unit 53 and holds it for a predetermined time, and outputs, when multiple pieces of the transmission-delay time information (D1) are acquired, the transmission-delay time information (D) indicating the frequency distribution information with the transmission delay times D1 to the transceiving unit 51 (step S109). The transceiving unit 51 then transmits the transmission-delay time information (D) to the transceiving unit 31 of the delivery managing device 2 (step S110). Thus, the transceiving unit 31 of the delivery managing device 2 receives the transmission-delay time information (D), and outputs the transmission-delay time information (D) to the line accommodation controller 27.

Next, the line accommodation controller 27 of the delivery managing device 2 newly calculates a reproduction delay time U', and calculates an operation condition, such as a frame rate of the converting unit 10 and a resolution of data, based on the transmission-delay time information (D) to output to the encoder bridge unit 30 (step S111). That is, the line accommodation controller 27 changes the action of the encoder bridge unit 30 based on the transmission-delay time information (D) and a data size (the number of bits, the number of bites).

Next, the transceiving unit 31 acquires reproduction-delay time information (U') indicating the reproduction delay time U' newly calculated at above step S111 from the encoder bridge unit 30, and transmits the reproduction-delay time information (U') to the transceiving unit 51 of the communication terminal 5 (step S112). Thus, the transceiving unit 51 of the communication terminal 5 receives the reproduction-delay time information (U').

Furthermore, the converting unit 10 in the encoder bridge unit 30 changes the operation condition of the converting unit 10 based on the line-accommodation control signal indicating the operation condition (step S113). For example, when the transmission delay time D1 is too long, because the reproduction time at the speaker 61 and the display unit 58 is to be too long if the reproduction delay time U is increased according to the transmission delay time D1, there is a limit for increasing the reproduction delay time U. Accordingly, the line accommodation controller 27 deals with congestion of the communication network 9 not only by causing the encoder bridge unit 30 to change the reproduction delay time U to the reproduction delay time U', but also by causing the converting unit 10 to decrease the frame rate of video (sound) data or to decrease the resolution of video (sound) data. Therefore, the encoder bridge unit 30 adds the time information ($T_0$) at the current time to the video (sound) data [A] as a time stamp as indicated at above step S103 (step S114). The transceiving unit 31 then transmits the video (sound) data and the time information ($T_0$) of the delivery managing device 2 to the transceiving unit 51 of the communication terminal 5 (step S115). Thus, the transceiving unit 51 of the communication terminal 5 receives the video (sound) data and the time information ($T_0$) of the delivery managing device 2, and outputs the video (sound) data and the time information ($T_0$) to reproduction control unit 53.

Next, in the communication terminal 5, the reproduction control unit 53 waits until the time ($T_0+U'-\Delta$) at the communication terminal 5 comes based on the reproduction-delay time information (U') acquired at above step S112, the time information ($T_0$) acquired at above step S115 and the time difference information ($\Delta$) stored in the storage unit 5000 at step S88 in FIG. 19, and then outputs the video (sound) data to the decoding unit 50, thereby causing the speaker 61 to reproduce sound, and the display unit to reproduce video through the rendering unit 55 (step S116). Thereafter, the processing at above step S106 and later is subsequently performed. Thus, the processing of downlink line accommodation control is successively performed.

<Processing of Uplink Line Accommodation Control>

Figure 21:
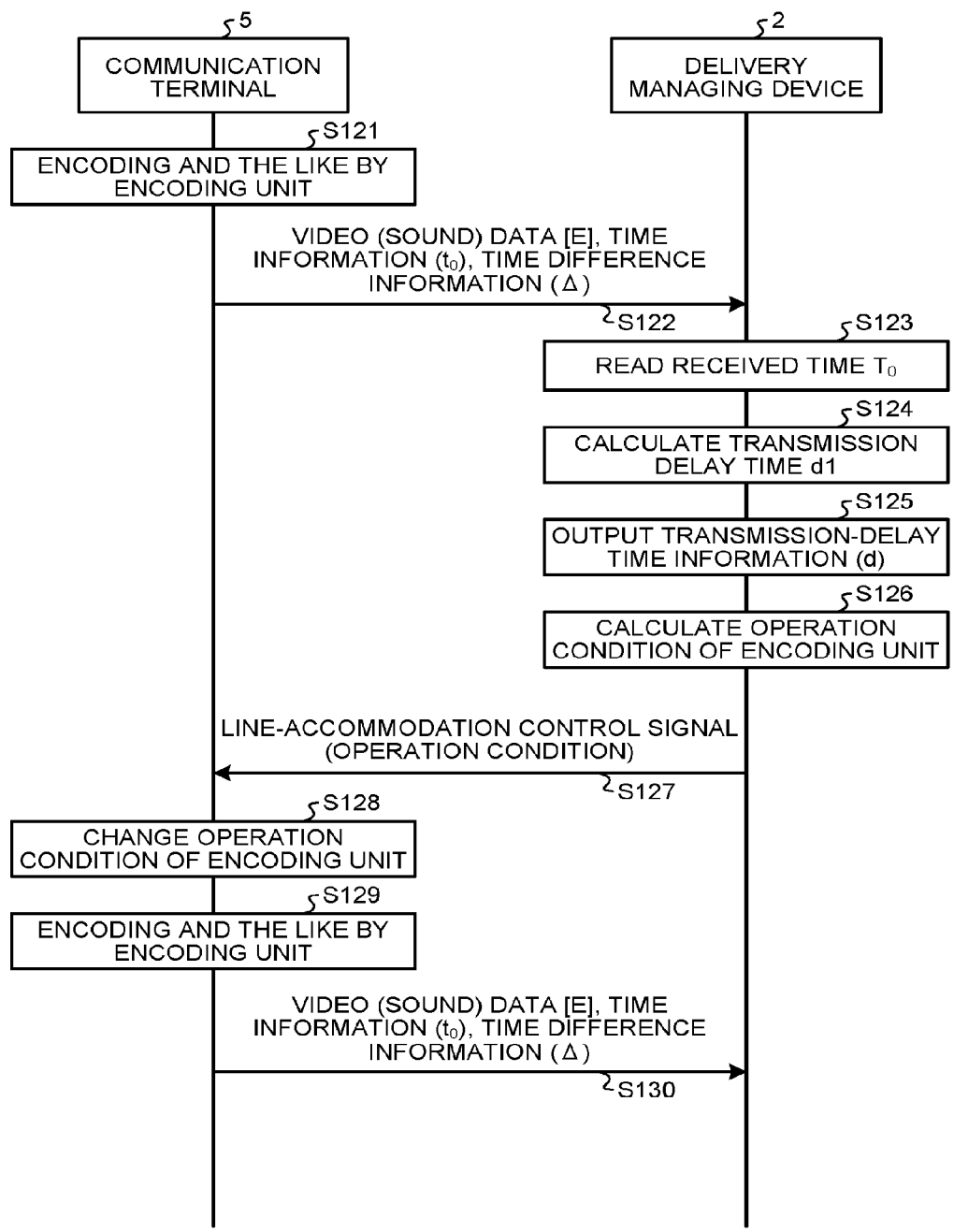
FIG. 21 is a sequence diagram showing processing of line accommodation control for data transmitted from a communication terminal to the delivery managing device.

Subsequently, processing of the line accommodation control of (uplink) data to be transmitted to the delivery managing device 2 from the communication terminal 5 is explained using FIG. 21. FIG. 21 is a sequence diagram showing processing of line accommodation control of data to be transmitted to the delivery managing device 2 from the communication terminal 5.

First, the encoding unit 60 of the communication terminal 5 encodes content data as the video (sound) data [E] that is input from the camera 62 and the microphone 63 (step S121). At this time, the encoding unit 60 acquires the time information ($T_0$) indicating the time t0 at the communication terminal 5 at the current time and the time difference information ($\Delta$) indicating the time difference $\Delta$ from the storage unit 5000, but does not perform encoding thereof. The transceiving unit 51 transmits the video (sound) data [E], the time information ($t_0$), and the time difference information ($\Delta$) to the transceiving unit 31 of the delivery managing device 2 (step S122). Thus, the transceiving unit 31 of the delivery managing device 2 receives the video (sound) data [E], the time information ($t_0$), and the time difference information ($\Delta$).

Next, in the delivery managing device 2, the decoding unit 40 reads the time $T_0$ indicating a point of time when the video (sound) data [E] and the like that are received at above step S122, from the time managing unit 25 (step S123). The decoding unit 40 then calculates the transmission delay time d1 that indicates a time period from transmission of the video (sound) data from the communication terminal 5 until reception thereof at the delivery managing device 2 (step S124). This calculation is performed by Equation (4) below. When the communication network 9 is busy, the transmission delay time d1 is to be long.

$$d1 = T_0 - (t_0 + \Delta) \quad (4)$$

Next, similarly to the delay-information acquiring unit 57 of the communication terminal 5, the delay-information acquiring unit 37a of the delivery managing device 2 acquires the transmission-delay time information (d1) indicating the transmission delay time d1 from the decoding unit 40 and holds it for a predetermined time, and outputs, when multiple pieces of the transmission-delay time information (d1) are acquired, the transmission-delay time information (d) that indicates the frequency distribution information with the transmission delay times d1 to the line accommodation controller 37b (step S125).

Next, the line accommodation controller 37b calculates an operation condition of the encoding unit 60 of the communication terminal 5 based on the transmission-delay time information (d) (step S126). The transceiving unit 31 then transmits a line-accommodation control signal indicating the operation condition, such as a frame rate and a resolution of data, to the transceiving unit 51 of the communication terminal 5 (step S127). Thus, the transceiving unit 51 of the communication terminal 5 receives the line-accommodation control signal. That is, while for the line accommodation controller 37b in a case of downlink, the line-accommodation control signal is output to the encoder bridge unit 30 in the same delivery managing device 2, for the line accommodation controller 37b in a case of uplink, the line-accommodation control signal is transmitted to the communication terminal 5 through the communication network 9 from the delivery managing device 2.

Next, the encoding unit 60 of the communication terminal 5 changes the operation condition of the encoding unit 60 based on the operation condition that is indicated by the line-accommodation control signal received by the transceiving unit 51 (step S128). The encoding unit 60 then performs processing similar to that at above step S121 according to the new operation condition (step S129). The transceiving unit 51 transmits the video (sound) data [E] that has been acquired from the camera 62 and the microphone 63 and has been encoded, the time information ($t_0$) that indicates the time $t_0$ at the communication terminal 5 at the current time acquired from the storage unit 5000, and the time difference information ($\Delta$) that indicates the time difference $\Delta$ similarly acquired from the storage unit 5000 to the transceiving unit 31 of the delivery managing device 2 as indicated at above step 5122 (step S130). Thus, the transceiving unit 31 of the delivery managing device 2 receives the video (sound) data [E], the time information ($t_0$), and the time difference information ($\Delta$). Thereafter, the processing at above step S123 and later is subsequently performed. Thus, the processing of the uplink line accommodation control is successively performed.

<Processing of Multi-Display>

Figure 22:
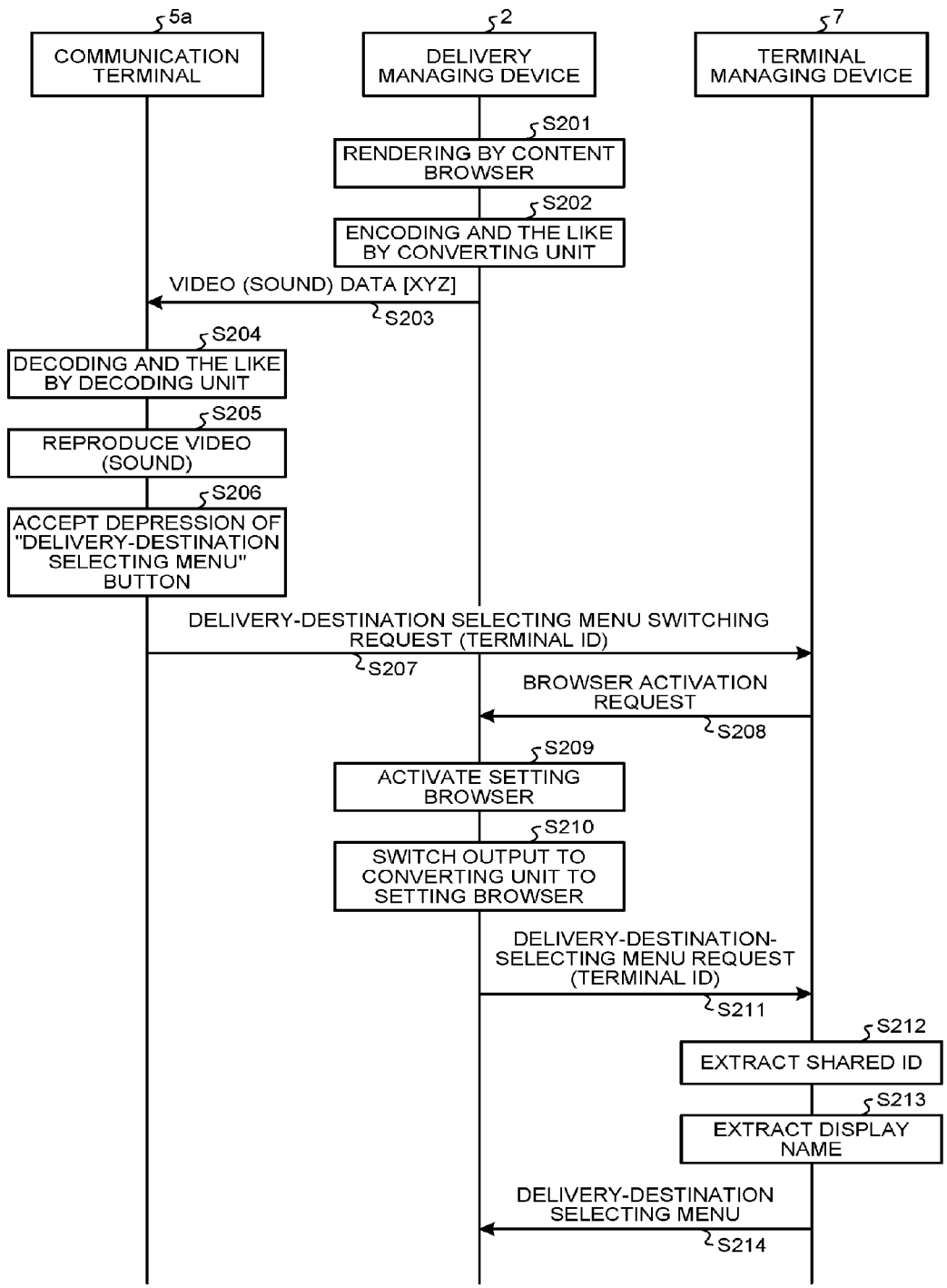
FIG. 22 is a sequence diagram showing processing of the multi-display.
Figure 23:
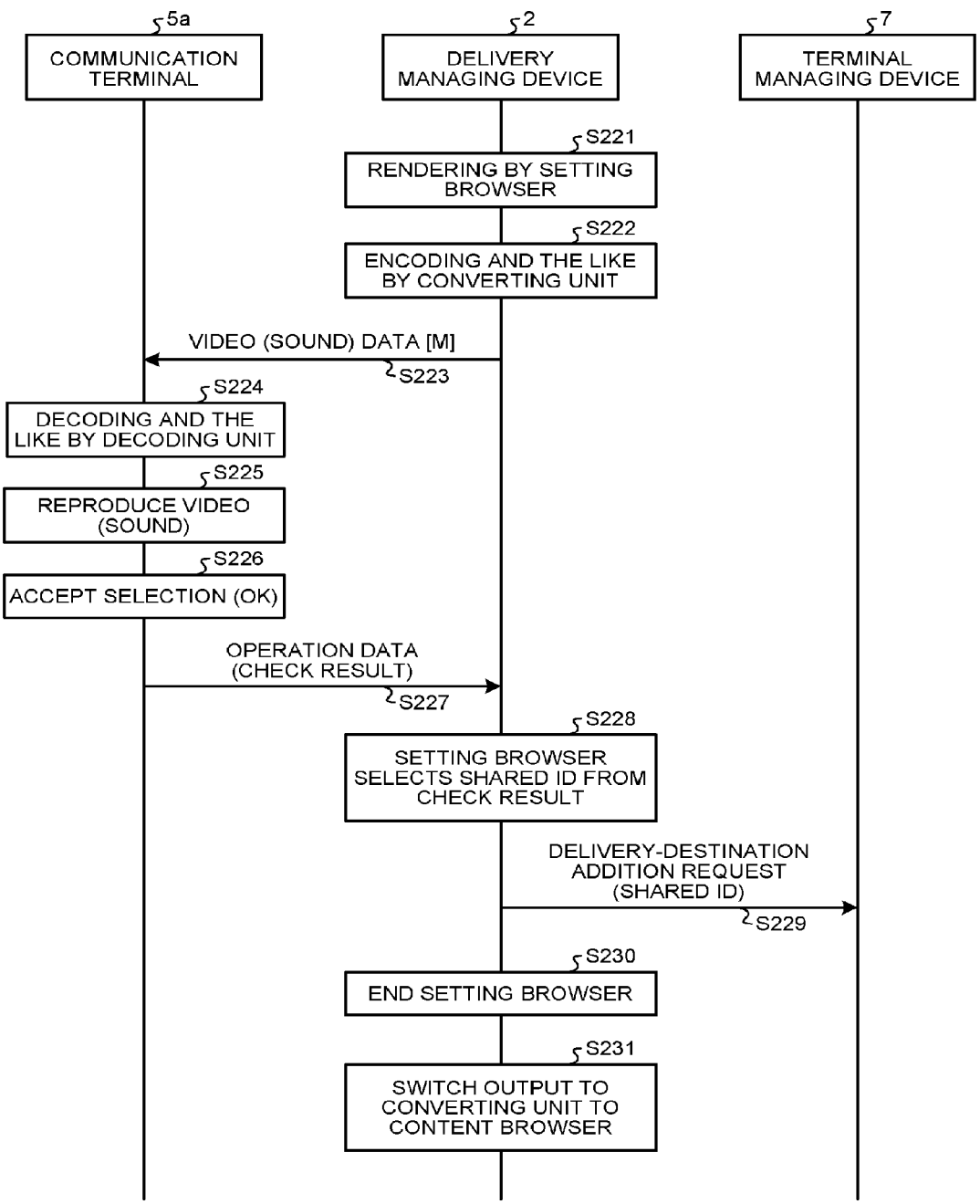
FIG. 23 is a sequence diagram showing processing of the multi-display.
Figure 24:
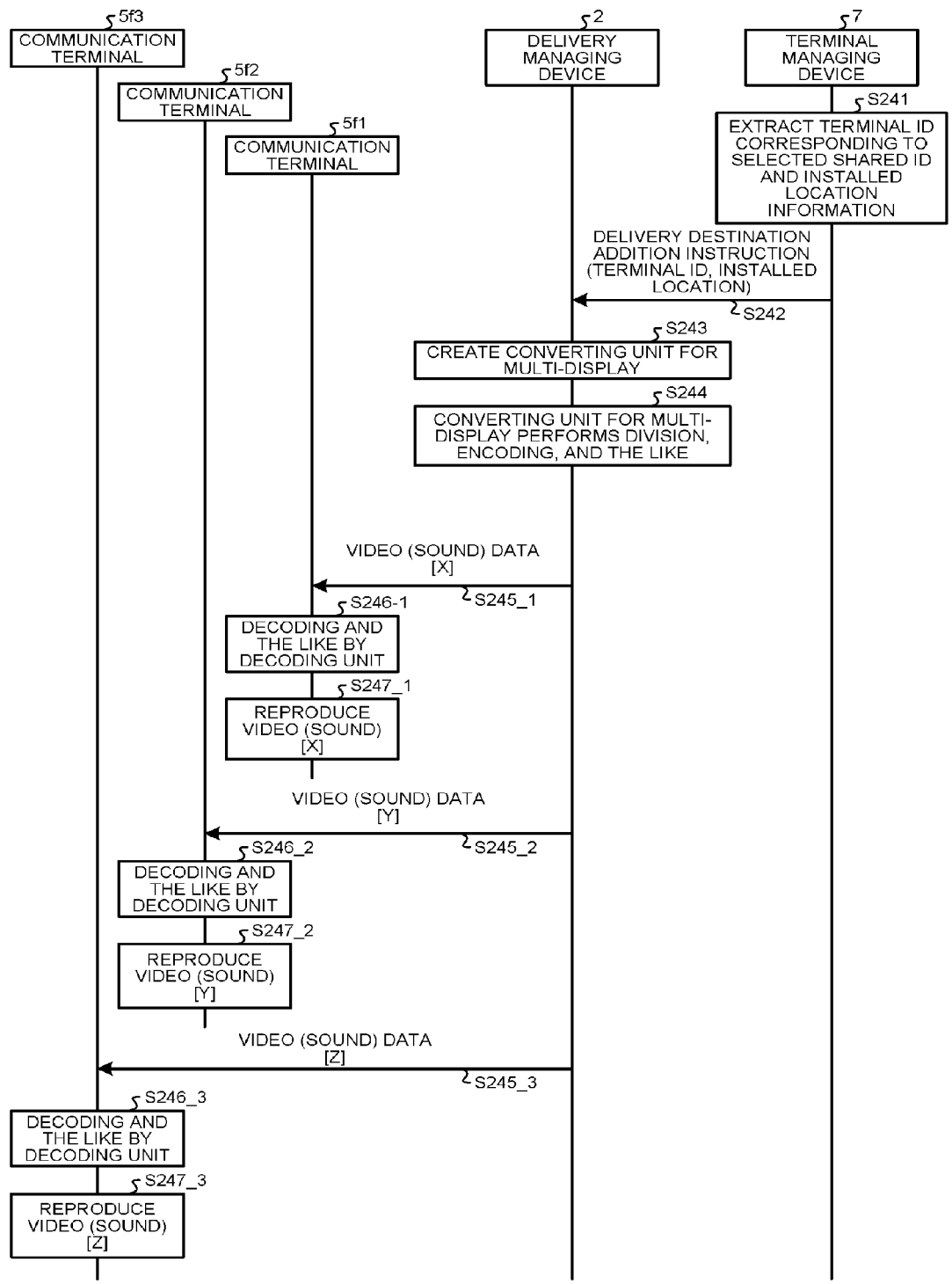
FIG. 24 is a sequence diagram showing processing of the multi-display.

Subsequently, processing of the multi-display is explained using FIG. 22 to FIG. 24. FIG. 22 to FIG. 24 are sequence diagrams showing the processing of the multi-display shown in FIG. 4.

Here, an example of reproducing the video (sound) data [XYZ] that is reproduced at the communication terminal 5a also on the respective communication terminals (5f1, 5f2, 5f3) in a divided manner is given.

Moreover, in this example, the browser 20 to display a web content is expressed as a "content browser 20a", and the browser 20 to display a setting screen for a user is expressed as a "setting browser 20b". Processing corresponding to step S30 in FIG. 18 is first explained.

First, as shown in FIG. 22, the content browser 20a of the delivery managing device 2 creates respective frame data as still image (sound) data by performing rendering of the web content [XYZ] acquired from the web server 8, and outputs to the transmission FIFO 24 (step S201). The converting unit 10 of the encoder bridge unit 30 encodes the video (sound) data stored in the transmission FIFO 24 to convert into the video (sound) data [XYZ] in a data format that can be delivered to the communication terminal 5a (step S202).

Next, the transceiving unit 31 of the delivery managing device 2 transmits the video (sound) data [XYZ] converted by the converting unit 10 described above to the transceiving unit 51 of the communication terminal 5a (step S203). Thus, the transceiving unit 51 of the communication terminal 5a receives the video (sound) data [XYZ] to output to the reproduction control unit 53.

Next, in the communication terminal 5a, the decoding unit 50 acquires the video (sound) data [XYZ] from the reproduction control unit 53 and performs decoding thereof (step S204). Thereafter, the speaker 61 reproduces sound based on the decoded sound data [XYZ], and the display unit 58 displays video based on the video data [XYZ] that is acquired from the decoding unit 50 and subjected to rendering by the rendering unit 55 (step S205).

Next, the screen that is displayed on the display unit 58 is switched to a menu request screen not shown by a user of the communication terminal 5a, and the operating unit 52 accepts depression of the "delivery-destination-selecting menu" not shown in the menu request screen (step S206). Thus, the transceiving unit 51 transmits a request for switching to the delivery-destination-selecting menu to the transceiving unit 71a of the terminal managing device 7 (step S207). Thus, the transceiving unit 71a of the terminal managing device 7 receives the request for switching to the delivery-destination-selecting menu. In this request, the terminal ID of the communication terminal 5a is included.

Next, the transceiving unit 71b transmits an activation request for the setting browser 20b to the transceiving unit 21 of the delivery managing device 2 (step S208). Thus, the transceiving unit 21 of the delivery managing device 2 receives the activation request for the setting browser 20b, and gives the activation request for the setting browser 20b to the browser managing unit 22.

Next, the browser managing unit 22 activates the setting browser 20b (step S209). The creating-selecting-transferring unit 310 of the encoder bridge unit 30 switches an output to the converting unit 10 (for example, the converting unit 10a) from the content browser 20a to an output to the converting unit 10 (for example the converting unit 10b) from the setting browser 20b (step S210). However, when the communication terminal 5a receives the video (sound) data by above step S203 sharing the converting unit 10 (for example, the converting unit 10a) with the other communication terminal 5 (for example, the communication terminal 5b), the other communication terminal 5 (for example, the communication terminal 5b) is using the converting unit 10 (for example the converting unit 10a) for the content browser 20a. Accordingly, the creating-selecting-transferring unit 310 of the encoder bridge unit 30 newly creates the converting unit 10 (for example, the converting unit 10b).

The transceiving unit 21 then transmits a delivery-destination-selecting menu request to the transceiving unit 71a of the terminal managing device 7 according to an instruction from the setting browser 20b (step S211). At this time, the terminal ID of the communication terminal 5a is also transmitted. Thus, the transceiving unit 71b of the terminal managing device 7 receives the delivery-destination-selecting menu request, and outputs the terminal ID of the communication terminal 5a to the storage unit 7000.

For this, the storage unit 7000 of the terminal managing device 7 searches the usable-terminal managing table 7010 based on this terminal ID, thereby extracting the corresponding shared ID (step S212). This shared ID indicates the communication terminal 5 that can be used for the communication terminal 5a to perform the remote sharing processing. For example, when the terminal ID of the communication terminal 5a is "t001", by searching the usable-terminal managing table 7020, the shared IDs "v003" and "v006" are extracted.

Furthermore, the storage unit 7000 extracts display name information that indicates a corresponding display name by searching the terminal managing table 7010 based on the extracted shared IDs (step S213). In this example, as shown in FIG. 16, the display names corresponding to the shared IDs "v003" and "v006" are "TOKYO HEADQUARTER 10F MFP" and "OSAKA EXHIBITION HALL 1F MULTI-DISPLAY", respectively.

The transceiving unit 71b then transmits delivery-destination-selecting menu data [M] as content data to the transceiving unit 21 of the delivery managing device 2, to the setting browser 20b of the delivery managing device 2 (step S214). Thus, the transceiving unit 21 of the delivery managing device 2 receives the delivery-destination-selecting menu data [M], to output to the setting browser 20b. This delivery-destination-selecting menu data [M] is information to display the delivery-destination-selecting menu screen shown in FIG. 15, and includes check boxes, shared IDs, and display names.

Next, as shown in FIG. 23, the setting browser 20b creates respective frame data as still (sound) data by performing rendering of the content data indicating the delivery-destination-selecting menu data [M] that has been acquired from the terminal managing device 7, to output to the transmission FIFO 24 (step S221). Subsequently, the converting unit 10 of the encoder bridge unit 30 encodes the respective frame data stored in the transmission FIFO 24, thereby converting into video (sound) data [M] in a data format that can be delivered to the communication terminal 5a (step S222).

Next, the transceiving unit 31 transmits the video (sound) data [M] converted by the converting unit 10 described above, to the transceiving unit 51 of the communication terminal 5a (step S223). Thus, the transceiving unit 51 of the communication terminal 5a receives the video (sound) data [M] to output to the reproduction control unit 53.

Next, in the communication terminal 5a, the decoding unit 50 acquires the video (sound) data [M] from the reproduction control unit 53 to perform decoding thereof (step S224). Thereafter, the display unit 58 reproduces video of the delivery-destination-selecting menu screen as shown in FIG. 15 based on video data [M] that has been acquired from the decoding unit 50 and subjected to rendering by the rendering unit 55 (step S225).

Next, in the delivery-destination-selecting menu screen shown in FIG. 15, when a check box of the shared ID "v006" is checked and the "OK" button is pressed by a user, the operating unit 52 accepts an operation input made by the user (step S226).

Next, the transceiving unit 51 transmits a check result to the transceiving unit 31 of the delivery managing device 2 as the operation data [p] (step S227). Thus, the transceiving unit 31 of the delivery managing device 2 receives the check result as the operation data [p], to output to the setting browser 20b.

Next, the setting browser 20b selects a shared Id from the check result (step S228). The transceiving unit 21 then transmits a delivery-destination addition request to the transceiving unit 71b of the terminal managing device 7 according to an instruction from the setting browser 20b (step S229). In this delivery-destination addition request, the shared ID selected at above step S228 is included. Thus, the transceiving unit 71b of the terminal managing device 7 receives the delivery-destination addition request, and outputs the shared ID to the storage unit 7000. Having fulfilled the role, the setting browser 20b is ended (step S230). Thereafter, the creating-selecting-transferring unit 310 of the encoder bridge unit 30 switches the output from the setting browser 20b to the converting unit 10 back to the output from the content browser 20a to the converting unit 10 (step S231).

Next, as shown in FIG. 24, in the storage unit 7000 of the terminal managing device 7, by searching the terminal managing table 7010 based on the shared ID that has been received at above step S229, a corresponding terminal ID and installed location information are extracted (step S241). The transceiving unit 71b then transmits an addition request of a delivery destination to the transceiving unit 21 of the delivery managing device 2 (step S242). In this addition request of a delivery destination, the terminal ID and the installed location information extracted at above step S241 are included. Thus, the transceiving unit 21 of the delivery managing device 2 receives the addition instruction of a delivery destination, and outputs the addition instruction of a delivery destination to the browser managing unit 22. In this example, it is assumed that three sets of the terminal ID and the installed location information, a terminal ID "t006" and installed location information "left", a terminal ID "t007" and installed location information "middle", and a terminal ID "t008" and installed location information "right" are included.

Next, the creating-selecting-transferring unit 310 of the encoder bridge unit 30 creates the converting unit 10 for the multi-display (step S243). In this case, the creating-selecting-transferring unit 310 acquires the terminal ID and the installed location information from the browser managing unit 22.

Subsequently, the dividing unit 13 of the converting unit 10 created at above step S243 divides respective frame data [XYZ] as still image (sound) data stored in the transmission FIFO 24, and the encoding unit 19 encodes the divided respective frame data (step S244).

The transceiving unit 31 transmits the video (sound) data [X] encoded by the encoder bridge unit 30 to the transceiving unit 51 of the communication terminal 5/1 based on the terminal ID ("t006") and the installed location information ("left") (step S245_1). Thus, the transceiving unit 51 of the communication terminal 5/1 receives the video (sound) data [X] to output to the reproduction control unit 53.

Next, in the communication terminal 5/1, the decoding unit 50 acquires the video (sound) data [X] from the reproduction control unit 53 and performs decoding thereof (step S246_1). Thereafter, the speaker 61 reproduces sound based on decoded sound data [X], and the display unit 58 reproduces video based on video data [X] that has been acquired from the decoding unit 50 and subjected to rendering by the rendering unit 55 (step S247_1).

Moreover, similarly, the transceiving unit 31 transmits video (sound) data [Y] encoded by the encoder bridge unit 30 to the transceiving unit 51 of the communication terminal 5/2 based on the terminal ID ("t007") and the installed location information ("middle") (step S245_2). Thus, the transceiving unit 51 of the communication terminal 5/2 receives the video (sound) data [Y] to output to the reproduction control unit 53.

Next, in the communication terminal 5/2, the decoding unit 50 acquires the video (sound) data [Y] from the reproduction control unit 53 and performs decoding thereof (step S246_2). Thereafter, the speaker 61 reproduces sound based on decoded sound data [Y], and the display unit 58 reproduces video based on video data [Y] that has been acquired from the decoding unit 50 and subjected to rendering by the rendering unit 55 (step S247_2).

Furthermore, similarly, the transceiving unit 31 transmits video (sound) data [Z] encoded by the encoder bridge unit 30 to the transceiving unit 51 of the communication terminal 5/3 based on the terminal ID ("t008") and the installed location information ("right") (step S245_3). Thus, the transceiving unit 51 of the communication terminal 5/3 receives the video (sound) data [Z] to output to the reproduction control unit 53.

Next, in the communication terminal 5/3, the decoding unit 50 acquires the video (sound) data [Z] from the reproduction control unit 53 and performs decoding thereof (step S246_3). Thereafter, the speaker 61 reproduces sound based on decoded sound data [Z], and the display unit 58 reproduces video based on video data [Z] that has been acquired from the decoding unit 50 and subjected to rendering by the rendering unit 55 (step S247_3).

<Processing of Delivery of Operation Data>

Figure 25:
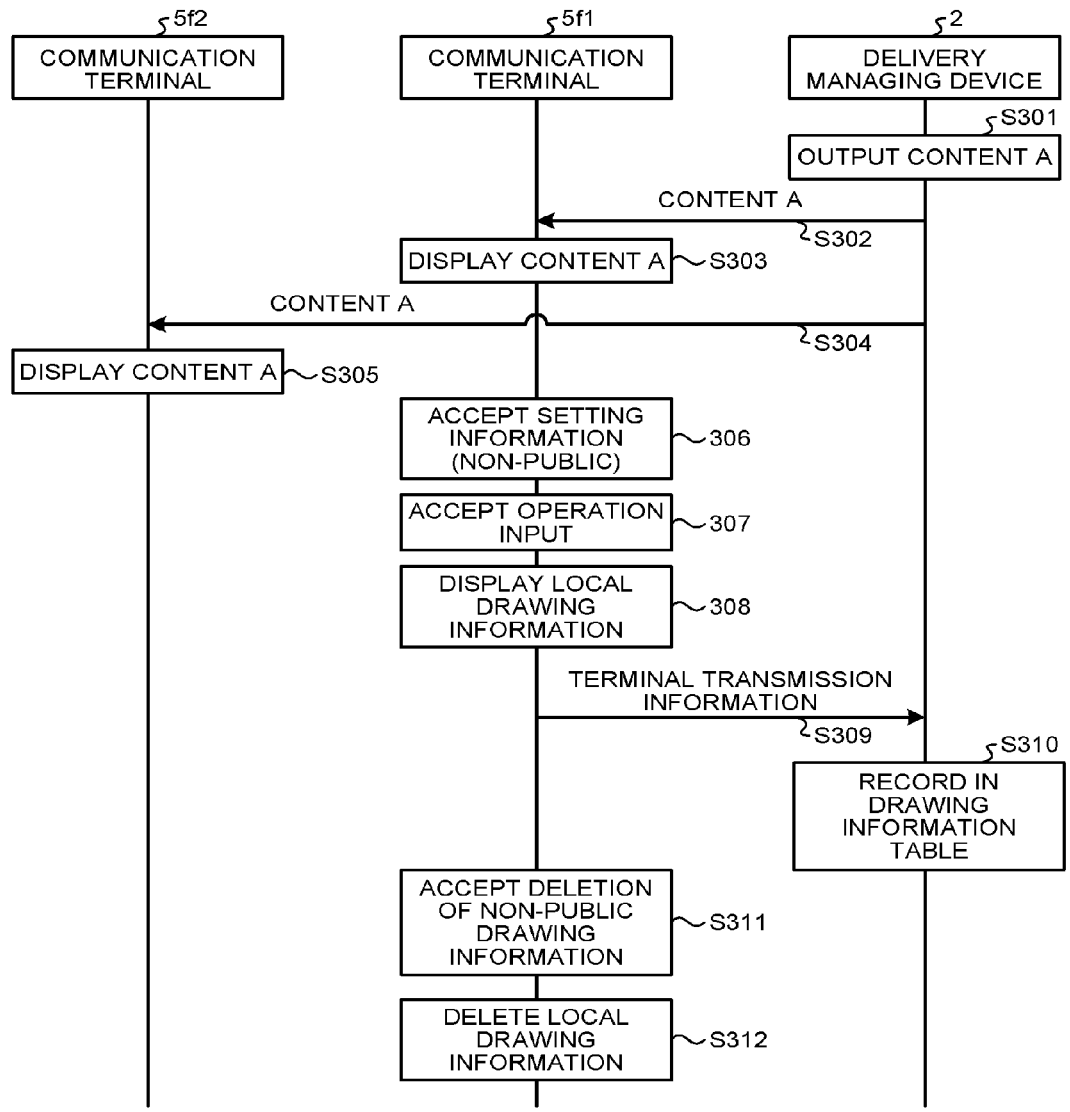
FIG. 25 is a sequence diagram showing drawing processing of non-public operation data.

Subsequently, processing of delivery of operation data is explained using FIG. 25 to FIG. 28B. FIG. 25 is a sequence diagram showing drawing processing of non-public operation data. The browser 20 of the delivery managing device 2 renders the content A to display as a background image of the communication terminal 5/1 and the communication terminal 5/2 to output (step S301). The encoder bridge unit 30 of the delivery managing device 2 encodes the rendered content A, to transmit to the communication terminal 5/1 and the communication terminal 5/2.

Next, the transceiving unit 31 of the delivery managing device 2 transmits the encoded content A to the communication terminal 5/1 (step S302). The transceiving unit 51 of the communication terminal 5/1 receives the encoded content A. The reproduction control unit 53 of the communication terminal 5/1 transmits the encoded content A to the decoding unit 50. The decoding unit 50 of the communication terminal 5/1 decodes the encoded content A to transmit to the rendering unit 55. The rendering unit 55 of the communication terminal 5/1 renders the decoded content A to display on the display unit 58 as a background image (step S303).

Similarly, the transceiving unit 31 of the delivery managing device 2 transmits the encoded content A to the communication terminal 5/2 (step S304). The transceiving unit 51 of the communication terminal 5/2 receives the encoded content A. The reproduction control unit 53 of the communication terminal 5/2 transmits the encoded content A to the decoding unit 50. The decoding unit 50 of the communication terminal 5/2 decodes the encoded content A to transmit to the rendering unit 55. The rendering unit 55 of the communication terminal 5/2 renders the decoded content A to display on the display unit 58 as a background image (step S305).

Next the operating unit 52 of the communication terminal 5/1 accepts setting information of operation data. In the example shown in FIG. 25, the operating unit 52 of the communication terminal 5/1 accepts the non-public setting of the operation data (step S306). A method of accepting the setting information of operation data is explained here.

Figure 27:
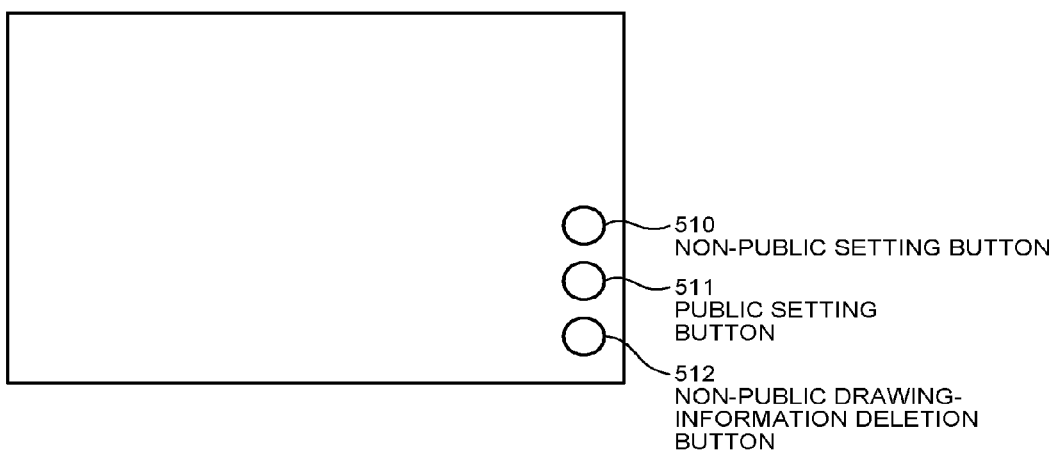
FIG. 27 is a conceptual drawing of a screen on which setting information relating to delivery of operation data is manipulated.

FIG. 27 is a conceptual drawing of a screen for manipulating the setting information relating to delivery of operation data. FIG. 27 shows an example in which a non-public setting button 510, a public setting button 511, and non-public drawing-information deletion button 512 are displayed at a right bottom portion of a screen of the display unit 58 in the communication terminal 5/1. The operating unit 52 detects depression of the non-public setting button 510, the public setting button 511, or the non-public drawing-information deletion button 512 by an electronic pen or the like. The operating unit 52 handles operation data of an operation input made after the non-public setting button 510 is depressed as operation data set to be non-public. The operating unit 52 handles operation data of an operation input made after the public setting button 511 is depressed as operation data set to be public. Moreover, the operating unit 52 transmits a deletion request to delete drawing information set to be non-public to the delivery managing device 2 through the transceiving unit 51 when the non-public drawing-information deletion button 512 is depressed. The non-public setting button 510 is a button to set drawing information that is drawn in an own terminal (in this example, the communication terminal 5/1, for example), to be displayed on the own terminal but not displayed on the other terminal (in this example, the communication terminal 5/2, for example). Moreover, the public setting button 511 is a button to set drawing information that is drawn in an own terminal (in this example, the communication terminal 5/1, for example), to be displayed on the own terminal and also on the other terminal (in this example, the communication terminal 5/2, for example). Furthermore, the non-public drawing-information deletion button 512 is a button to set drawing information that has been drawn and displayed in an own terminal (in this example, the communication terminal 5/1, for example), to be deleted from the own terminal.

Returning back to FIG. 25, the operating unit 52 of the communication terminal 5/1 accepts operation data that indicates an operation input made by an electronic pen or the like (step S307). The operating unit 52 of the communication terminal 5/1 transmits the operation data to the drawing control unit 64. The drawing control unit 64 instructs the rendering unit 55 to perform rendering based on the operation data. Next, the rendering unit 55 displays local drawing information based on the operation data on the display unit 58 (step S308). Next, the operating unit 52 of the communication terminal 5/1 transmits terminal transmission information in which the operation data indicating the accepted operation input, the setting information indicating the non-public setting, and the identification information to identify the communication terminal 5/1 are associated with each other to the delivery managing device 2 (step S309). As described above, the drawing information is displayed only on the communication terminal 5/1 being the own terminal, and the drawing information of the communication terminal 5/1 is not displayed on the communication terminal 5/2 being the other terminal.

The browser managing unit 22 of the delivery managing device 2 receives terminal transmission information that includes the operation data of the communication terminal 5/1 through the transceiving unit 31. The browser managing unit 22 transmits the terminal transmission information including the operation data of the communication terminal 5/1 to the browser 20. The browser 20 creates a record of the drawing information table 7030 shown in FIG. 10 from the terminal transmission information received from the communication terminal 5/1 (step S310). Specifically, the browser 20 sets a drawing-command information field and a coordinate information field based on the operation data of the terminal transmission information, and sets a terminal information field (5/1) based on the identification information of the communication terminal 5/1 of the terminal transmission information, and sets the setting information (non-public) of the terminal transmission information to a setting information field (non-public).

The browser 20 of the delivery managing device 2 does not use records having the setting information field set to non-public in the drawing information table 7030 when creating public display information. Note that records having the setting information field set to non-public in the drawing information table 7030 can be used as a backup of the non-public drawing information. This enables to recover non-public drawing information even if the non-public drawing information of the communication terminal 5/1 is lost due to a power interruption.

Next, the operating unit 52 of the communication terminal 5/1 accepts deletion of non-public drawing information by the non-public drawing-information deletion button 512 shown in FIG. 27 (step S311). Subsequently, the drawing control unit 64 instructs the rendering unit 55 to delete the local drawing information that is displayed at step S308. Next, the rendering unit 55 deletes the local drawing information (step S312). As described above, drawing information that has been drawn and displayed in an own terminal (in this example, the communication terminal 5/1, for example) is deleted from the own terminal.

Note that the steps at step S309 and step S310 can be omitted. That is, the terminal transmission information is not required to be transmitted to the delivery managing device 2. In this case, by holding the terminal transmission information only in the communication terminal 5/1, the security can be assured.

Figure 26:
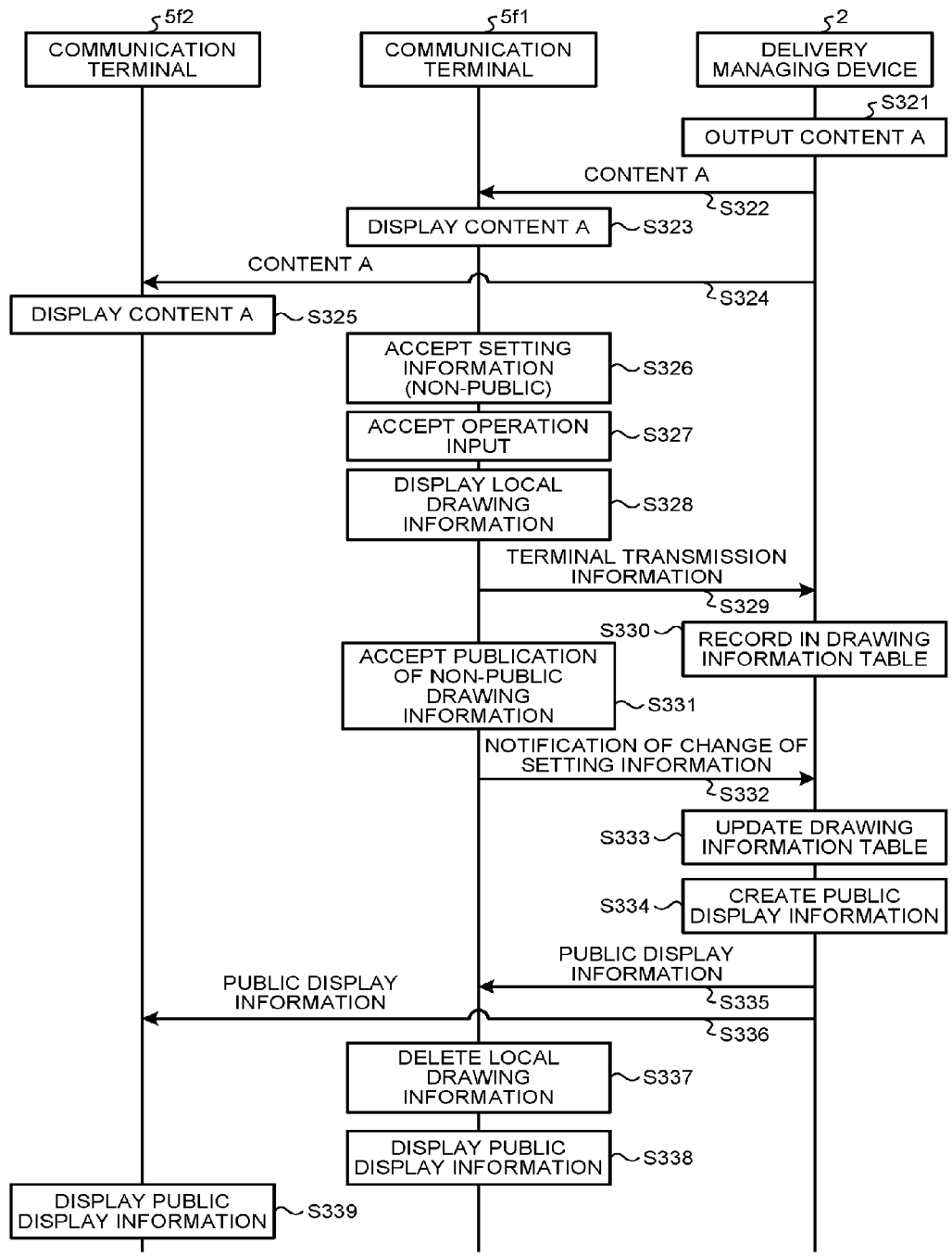
FIG. 26 is a sequence diagram showing processing of publishing the non-public operation data.

Next, processing of switching the setting information of delivery of operation data from the non-public setting to the public setting is explained. FIG. 26 is a sequence diagram showing processing of publishing the non-public operation data. Because step S321 to step S330 are the same as step S301 to step S310 in FIG. 25, explanation thereof is omitted.

Next, the operating unit 52 of the communication terminal 5/1 detects depression of the public setting button 511 in FIG. 27 (step S331). Subsequently, the operating unit 52 of the communication terminal 5/1 transmits a change notification of the setting information that includes the identification of the communication terminal 5/1 to the delivery managing device 2 through the transceiving unit 51 (step S332).

Next, the browser managing unit 22 of the delivery managing device 2 receives the change notification of the setting information through the transceiving unit 31. The browser managing unit 22 transmits the change notification of the setting information to the browser 20. The browser 20 searches for a record of the drawing information table 7030 that includes the terminal information corresponding to the identification information included in the change notification of the setting information, and updates the setting information of the record from non-public to public (step S333). Subsequently, the browser 20 creates public display information from the drawing information table 7030 and the background image (content A) (step S334). The browser 20 outputs the public display information to the transmission FIFO 24. The encoder bridge unit 30 reads the public display information from the transmission FIFO 24 and performs encoding thereof. The encoder bridge unit 30 transmits the encoded public display information to the communication terminal 5/1 and the communication terminal 5/2 through the transceiving unit 31 (step S335 and step S336).

Next, the transceiving unit 51 of the communication terminal 5/1 receives the encoded public display information. The reproduction control unit 53 of the communication terminal 5/1 transmits the encoded public display information to the decoding unit 50. The decoding unit 50 of the communication terminal 5/1 decodes the encoded public display information to transmit to the rendering unit 55. Subsequently, the drawing control unit 64 reads the reproduction delay time U from the storage unit 5000, and instructs the rendering unit 55 to delete the local drawing information that is displayed at step S328 when the display scheduled time of the public display information has come. Next, the rendering unit 55 deletes the local drawing information (step S337). Subsequently, the rendering unit 55 performs rendering of the decoded public display information to display on the display unit (step S338).

Moreover, the transceiving unit 51 of the communication terminal 5/2 receives the encoded public display information. The reproduction control unit 53 of the communication terminal 5/2 transmits the encoded public display information to the decoding unit 50. The decoding unit 50 of the communication terminal 5/2 decodes the encoded public display information to transmit to the rendering unit 55. Subsequently, the rendering unit 55 performs rendering of the decoded public display information to display on the display unit 58 (step S339). As described above, drawing information that has been drawn and displayed in an own terminal (in this example, the communication terminal 5/1, for example) is displayed on the own terminal, and the drawing information is further displayed also on the other terminal (in this example, the communication terminal 5/2, for example).

Note that the steps at step 5329 and step 5330 can be omitted. That is, the terminal transmission information is not required to be transmitted to the delivery managing device 2. In this case, by holding the terminal transmission information only in the communication terminal 5/1, and by controlling to transmit the terminal transmission information to the delivery managing device 2 when publication of the non-public drawing information is accepted at step S331, the security can be assured.

Figure 28A:
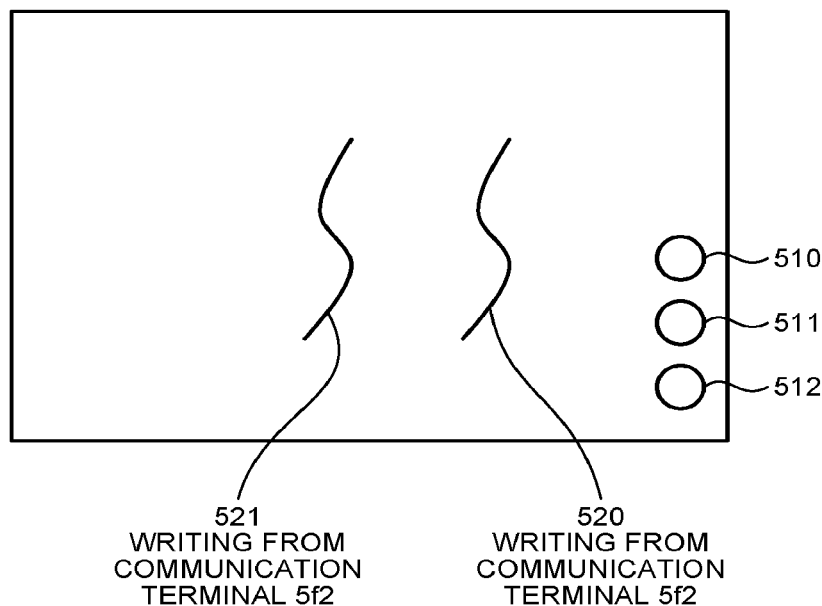
FIG. 28A is a diagram showing a display example of public display information.
Figure 28B:
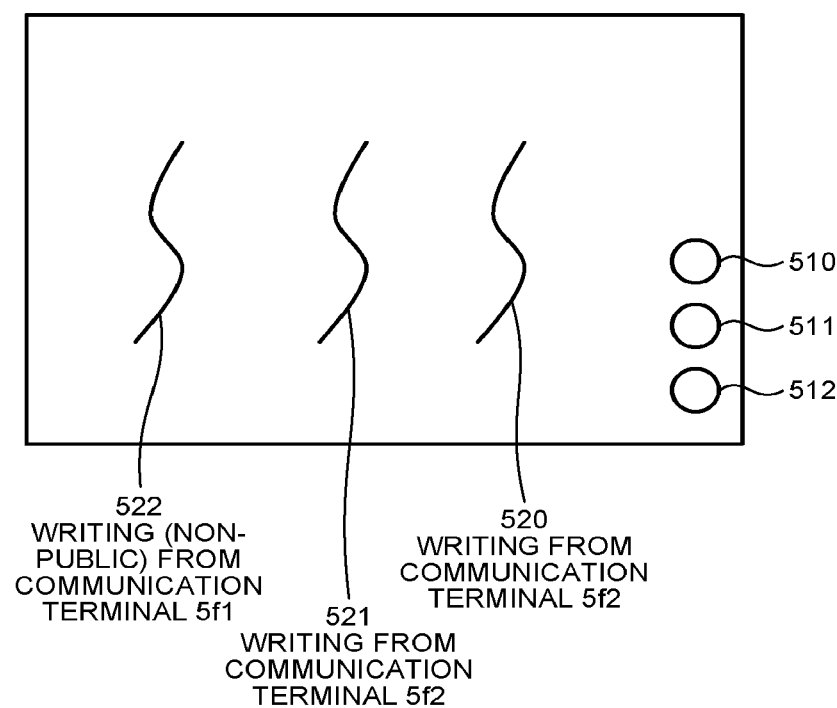
FIG. 28B is a diagram showing a display example of non-public display information.

FIG. 28A is a diagram showing a display example of public display information. FIG. 28A shows a case in which writing 520 from the communication terminal 5/2 and writing 521 from the communication terminal 5/2 are included. FIG. 28B is a diagram showing a display example of non-public display information. FIG. 28B shows a case in which the writing 520 from the communication terminal 5/2, the writing 521 from the communication terminal 5/2, and writing 522 (non-public) from the communication terminal 5/1 are included. Even when there is the writing 522 (non-public) from the communication terminal 5/1 shown in FIG. 28B, at the communication terminal 5/2, the writing 522 (non-public) from the communication terminal 5/1 is not displayed, and a screen shown in FIG. 28A is displayed. On the other hand, at the communication terminal 5/1, a screen shown in FIG. 28B including the writing 522 (non-public) from the communication terminal 5/1 is displayed.

[Main Effect of Embodiment]

As explained in detail with specific examples above, in the delivery system 1 of the present embodiment, the delivery managing device 2 has the browser 20 and the encoder bridge unit 30 that performs encoding and the like on the cloud. Thus, the browser 20 creates video data and sound data from content data that is described in a predetermined description language, and the encoder bridge unit 30 converts a data format so as to enable delivery through the communication network 9, to deliver to the communication terminal 5. Therefore, in the communication terminal 5, a load of receiving content data described in a predetermined description language and a load of converting the data into video data and sound data after reception are reduced, and therefore, a problem of heavy loads to support rich contents can be solved.

Particularly, the browser 20 enables real-time communication, and the converting unit 10 performs real-time encoding on video (sound) data generated by the browser 20. Therefore, for example, unlike a case in which non-real time (that is, encoded in advance) video (sound) data is selected by a DVD player to be delivered as on-demand delivery of video (sound) data, processing of the delivery managing device 2 enables delivery of video (sound) data having an excellent real-time property because a content that is acquired right before delivery is rendered to create video (sound) data, and then encoded.

According to the delivery system 1 of the present embodiment, drawing information that is displayed only at the own communication terminal 5 and drawing information that is displayed also at the other communication terminal 5 can be displayed on the terminals in a distinguished manner.

In the explanation of the delivery system 1 of the present embodiment, the operation (step S309 in FIG. 25) of the communication terminal 5 transmitting terminal transmission information including operation data to the delivery managing device 2 even when the setting information of the operation data of the communication terminal 5 is non-public has been explained. However, when the setting information of operation data of the communication terminal 5 is non-public, the communication terminal 5 may operate so as not to transmit the operation data to the delivery managing device 2. That is, when the setting information of operation data is non-public, the communication terminal 5 displays drawing information based on the operation data on the own communication terminal 5 as local drawing information. When the setting information of the operation data is changed from non-public to public, terminal transmission information including the operation data that has been displayed as the local drawing information is transmitted to the delivery managing device 2. Thus, the delivery managing device 2 delivers public display information including the operation data the setting information of which is changed from non-public to public, to the other communication terminal 5.

[Supplementary Explanation]

Although the terminal managing device 7 and the delivery managing device 2 are configured as independent devices separate from each other in the delivery system 1 of the present embodiment, the terminal managing device 7 and the delivery managing device 2 may be configured as an integrated device, for example, by causing the delivery managing device 2 to have the function of the terminal managing device 7, for example.

Moreover, the delivery managing device 2 and the terminal managing device 7 in the above embodiment may be constituted of a single computer, or may be constituted of multiple computers to which respective separated components (functions, units, or storage units) are arbitrarily allocated.

Furthermore, both of a recording medium, such as a compact disk (CD)-ROM, in which respective programs of the above embodiment are stored, and the HDD 204 in which these programs are stored can be provided in the country and abroad as a program product.

CITATION LIST

Patent Literature

Patent Literature 1: Japanese Laid-open Patent Publication No. 2005-204046

The invention claimed is:

1. A delivery managing device to which a plurality of terminals are connected through a network, the delivery managing device comprising:
processing circuitry configured to
create display information based on operation information indicating an operation input accepted by a terminal of the plurality of terminals;
convert the display information into video information; and
deliver the video information to the terminal, wherein
when the delivery managing device receives non-public operation information from the terminal, the non-public operation information indicating operation information that is to not be published to another terminal of the plurality of terminals, the processing circuitry is further configured to
create second display information that is not based on the non-public operation information,
convert the second display information into second video information, the second video information being not based on the non-public operation information, and
deliver the second video information to the other terminal.

2. The delivery managing device according to claim 1, wherein when the delivery managing device receives public operation information that is to be published to the other terminal, the processing circuitry is configured to
create third display information that is based on the public operation information,
convert the third display information into third video information, and
deliver the third video information to the other terminal.

3. A terminal that is connected to another terminal, comprising:
processing circuitry configured to
receive drawing information that is drawn in the terminal; and
control a display to display the drawing information, wherein
when the processing circuitry receives non-public drawing information that is to not be published to another terminal, the non-public drawing information is not published to the other terminal.

4. The terminal according to claim 3, wherein when the processing circuitry receives deletion information to delete the non-public drawing information, the display control unit processing circuitry deletes the non-public drawing information.

5. A delivery managing method for a delivery managing device to which a plurality of terminals are connected through a network, the method comprising:
creating, by the delivery managing device, display information based on operation information that indicates an operation input accepted by a terminal of the plurality of terminals;
converting the display information into video information;
delivering the video information to the terminal; and
when the delivery managing device receives non-public operation information from the terminal, the non-public operation information indicating operation information that is to not be published to another terminal of the plurality of terminals:
creating second display information that is not based on the non-public operation information;
converting the second display information into second video information, the second video information being not based on the non-public operation information; and
delivering the second video information to the other terminal.

* * * * *